May 11, 1965
W. J. SCHMIDT ETAL
3,183,436
PULSE OPERATED COUNTING APPARATUS FOR
MEASURING SPEED DIFFERENCE
Filed June 14, 1960
9 Sheets-Sheet 1
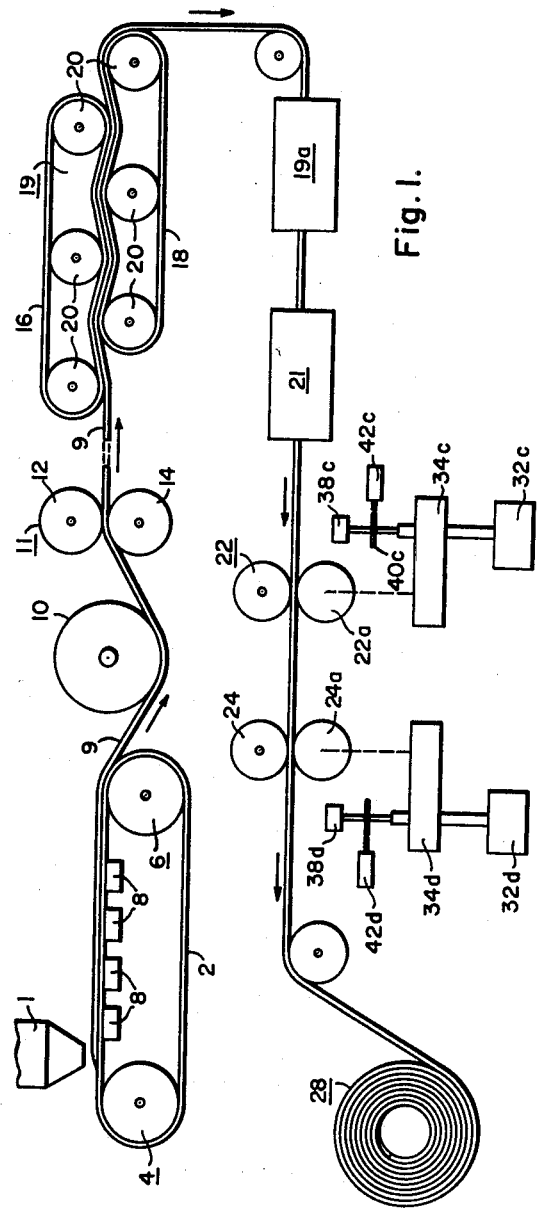
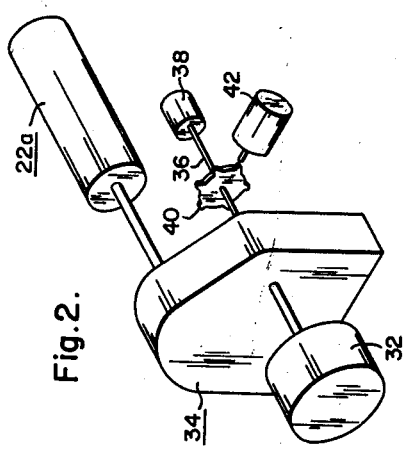
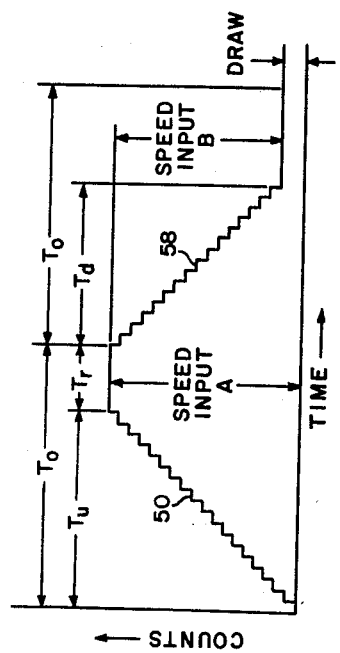
WITNESSES
Edwin E. Bassler
Leon J. Faga
INVENTORS
Warren J. Schmidt &
Seymour Salowe
BY
John L. Houghton
ATTORNEY

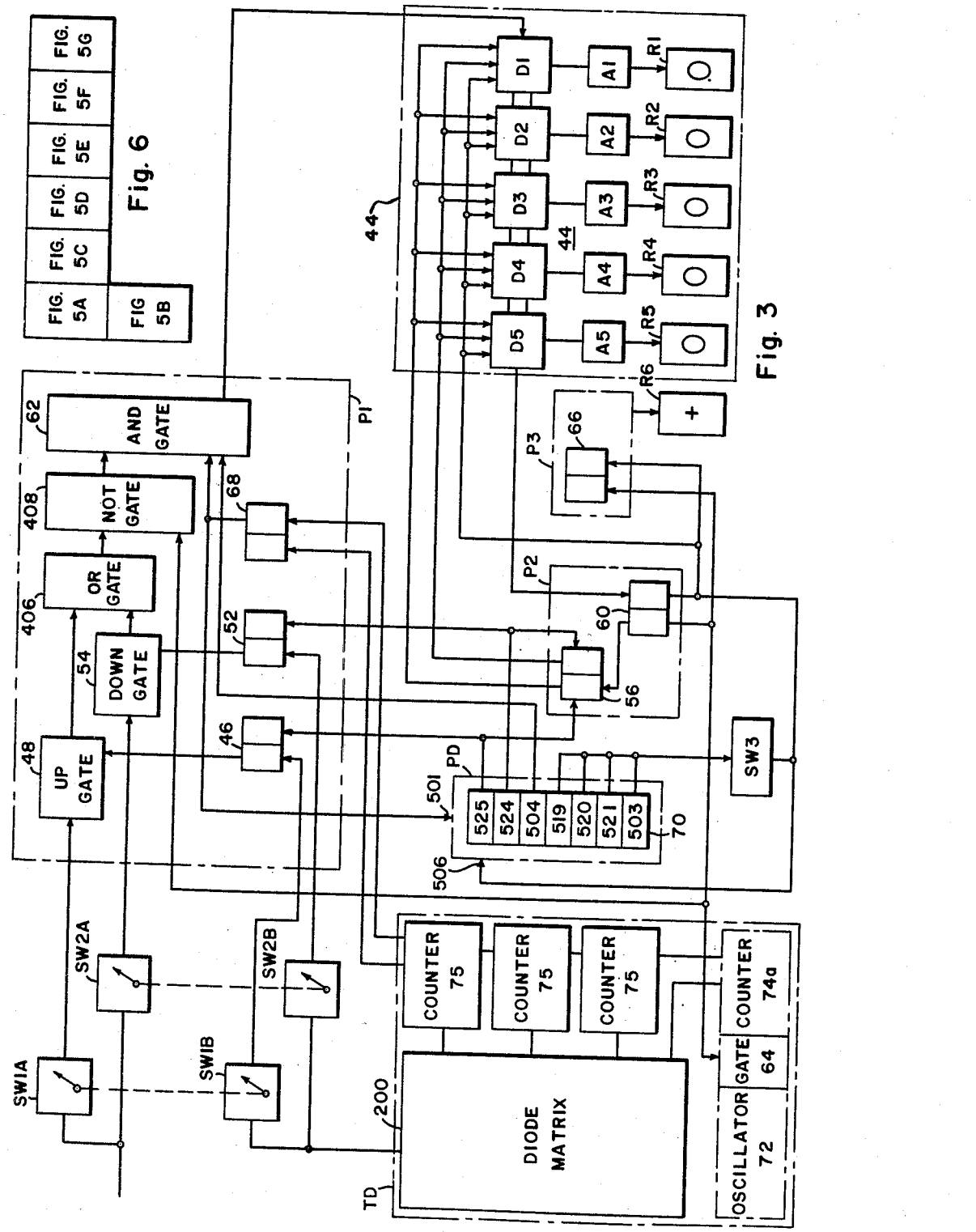

United States Patent Office 3,183,436
Patented May 11, 1965

3,183,436
PULSE OPERATED COUNTING APPARATUS FOR MEASURING SPEED DIFFERENCE
Warren J. Schmidt, Upper Montclair, and Seymour Salowe, East Orange, N.J., assignors to Westinghouse Electric Corporation, East Pittsburgh, Pa., a corporation of Pennsylvania
Filed June 14, 1960, Ser. No. 36,046
25 Claims. (Cl. 324—69)

This invention relates generally to measuring apparatus and more specifically to a digital type of apparatus for determining the difference in peripheral speed between two rotating drums.

In the manufacture of paper, the paper is passed sequentially through a plurality of rolls as an endless strip. A precise indication of the relative speeds of the rolls is necessary to properly operate this machine in a manner to produce paper of consistent quality. If the paper through the preceding roll moves too fast then it will supply too much paper to the succeeding roll and it will be necessary to readjust the machine to prevent the manufacture of an inferior product. If the preceding roll runs too slow with respect to the succeeding roll then there is too much draw on the paper between the two rolls and the paper will tear and the machine will have to be shut down and rethreaded.

It is an object of this invention to provide an apparatus for accurately measuring the peripheral speed of a roll over which paper is passing, or is to be passed, so that the speed of the rolls may be properly regulated in a convenient manner.

Another object of this invention is to measure the speed of a medium by counting the number of units of the medium which moves past a predetermined spot during a measured time interval and to control the time measuring interval so that the counted number of units is a function of the number of units of the medium per unit of time as for example feet per minute.

Another object of this invention is to provide a counting device which will initially count in a first direction for a predetermined interval and thereafter count in a second direction for a predetermined interval.

A further object of this invention is to provide such an apparatus in which the difference in speed between two rolls may be readily and accurately obtained.

A still further object of this invention is to measure the peripheral speed of a first roll by counting the number of peripheral feet of the first roll which passes a fixed point for a predetermined time interval to provide a total count which is proportional to the peripheral speed and to measure the peripheral speed of a second roll by counting the number of peripheral feet of the second roll which passes a first point for a second predetermined time interval to provide a second total count which has the same proportions to the speed of the second roll as does the total count of the first roll and to subtract the second count from the first count to provide an indication of the speed difference between the two rolls.

A still further object of this invention is to measure the peripheral speed of a first roll by counting in an upward or increasing direction for a predetermined time interval and to measure the peripheral speed of a second roll by counting in a downward or decreasing direction for a predetermined time interval whereby the resulting tally on the counter will indicate the peripheral speed difference of the first and second rolls.

A further object is to provide, in an up-down counter, means for indicating the difference in the two counts by a plus or minus reading to indicate the direction of the relative speed.

Another object of this invention is to provide, in such an up-down counter, means for concurrently interrupting the flow of counting signals and interrupting the time interval measuring apparatus substantially at the time the down count equals the up count to enable the counter directions to be reversed during an interval when no counting signals are supplied and when the measurement of the counting time interval is halted and for concurrently reestablishing the flow of counting signals and reestablishing of the time interval measuring apparatus.

Other objects of the invention will be apparent from the specification, the appended claims and the drawings, in which drawings:

FIGURE 1 is a diagrammatic representation of a paper making machine with which the invention may be used;

FIG. 2 is an enlarged partial view of one form of a roll driving mechanism of the machine of FIG. 1 illustrating one way in which the driving pulses for the measuring apparatus may be obtained;

FIG. 3 is a block diagram of an apparatus for measuring the difference in peripheral speed of two rotating rolls which embodies the invention;

FIG. 4 is a diagrammatic view illustrating the basic theory of operation of this speed measuring apparatus;

Figure 5A:
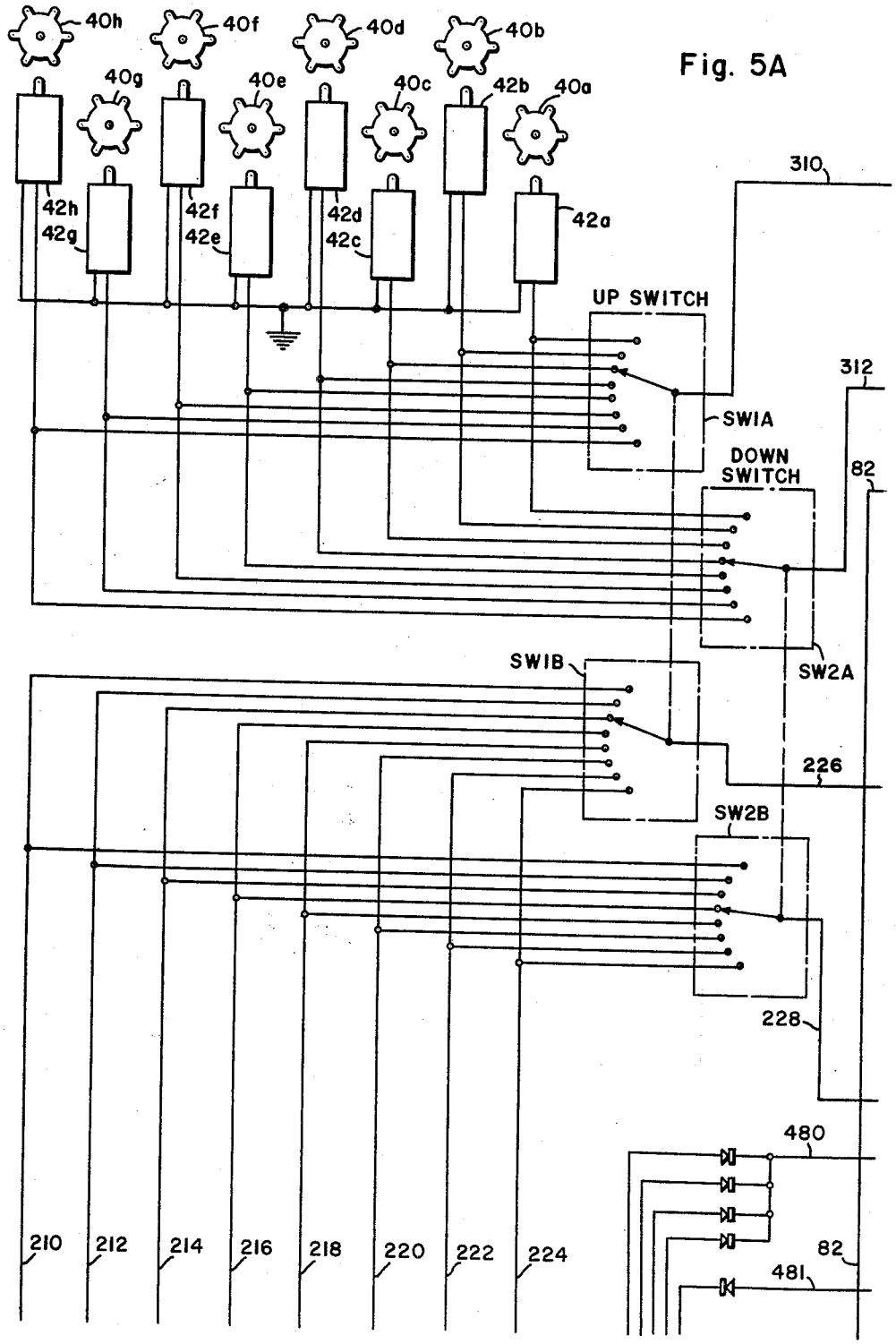

FIGS. 5A through 5G, when arranged together as shown in FIG. 6, schematically illustrate a preferred form of speed measuring apparatus embodying the invention; and, FIG. 6 illustrates the manner in which FIGS. 5A through 5G are to be combined together.

FIGURE 1 illustrates diagrammatically a typical paper making machine in which wet pulp is transformed into a strip of finished paper. Wet pulp which may be 99% water and 1% pulp flows from a head box 1 onto an endless belt 2 which rides over a pair of rolls 4 and 6. Located beneath the belt 4 are a plurality of suction boxes 8 which draw air downwardly through the pulp layer 9 on top of the belt 2. This air flow removes much of the water from the pulp and by the time the pulp has passed over the roll 6 the pulp 9 will have attained sufficient strength to hold itself together. After leaving the belt 4, the layer 9 passes a perforated roll or drum 10 commonly referred to as a couch. A vacuum is maintained within the couch 10 and holds layer 9 against its outer surface to continue the water removal or drying process. After passing over the drum or couch 10 the paper passes between a first press 11 comprising a pair of drums or rolls 12 and 14 which compact the layer 9 and remove additional moisture therefrom. The layer 9 then passes between a pair of endless belts 16 and 18 of a first steam heated dryer 19 having a plurality of steam heated rolls 20. Additional presses and a breaker stack (not shown but well known in the paper making art) may be interposed between the press 11 and dryer 19. After leaving the dryer 19, the layer 9 may pass through an additional dryer or dryers 19a and a clupak 21. It is to be understood that any number of these dryers may be used in accordance with the teachings well known in the paper making art.

After passing the final one of the dryers 19a and the clupak 21, the layer 9 passes between additional presses or calenders 22 and 24, only two of which are shown. As illustrated the calenders comprise dryer rolls 22a and 24a. These calenders further compact and/or stretch as desired the layer 9 which has been transformed into an endless strip of paper which is thereafter wound into a roll 28 of finished paper known as a machine roll.

As the layer 9 progresses through the paper making machine, as above described, its speed is gradually increased to provide controlled amounts of draw or stretching of the layer 9 for purposes well known to those skilled in the paper making art. For the purposes of describing this invention the reasons therefor are unimportant; it being necessary to understand that to provide such drawing or stretching the relative speeds of the rolls must be accurately known. As stated, this invention is concerned only with the measurement of the peripheral speeds of the rolls and the layer 9 as it passes the various machine stations to insure the correct amount of draw or compacting of the layer 9 as the case may be.

In FIG. 2, there is shown an enlarged schematic representation of one of the rolls 22a referred to in the description of FIG. 1 which may be driven by a motor 32 through a speed reducer 34. The speed reducer, as is normal in the paper making industry, is provided with an outwardly projecting shaft 36 to which the usual tachometer 38 is attached. The tachometer 38 is connected through apparatus, not shown, to control the speed of operation of the drive motor 32. The shaft 36 which rotates at a speed, proportioned to but greater than that of the roll 22a provides a convenient drive for a toothed gear 40 which cooperates with a pickup device 42 to provide voltage pulses which have a frequency which is in direct proportion to the peripheral speed of the roll 22a and of the layer 9 passing through the calender 22.

As illustrated in FIGURES 3 and 4, the peripheral speed of the roll which is being measured is accomplished by a counting apparatus 44 which counts the actual number of pulses supplied by the appropriate one of the pickup devices 42 (eight, 42a–42h, thereof being shown) under control of the switch SW1A. These pulses pass through the programmer P1 to the counter 44. A timing device TD controls the open condition of the programmer P1 so that pulses are transmitted therethrough for solely a desired time interval. At the start of the timing interval, timing device TD actuates a bistable multivibrator 68 to open the AND-gate 62 and pulses flow to the counter 44. At the end of a predetermined timing interval the timing device TD, acting through the switch SW1B, actuates a bistable multivibrator 46 of the programmer P1 which closes UP-gate 48 also in the programmer P1 to terminate the flow of pulses to the counter 44. This interval is identified as Tu in FIG. 4 and is chosen with respect to the diameter of the roll 22a, the speed ratio between the roll 22a and the shaft 36, and the number of teeth on the gear 40 such that the total number of the pulses counted will be equal to the exact speed of the periphery of the roll 22a and of the layer 9 passing thereover. This speed may be indicated in any desired units and may conveniently be in feet per minute. The stepped line 50 schematically illustrates the pulses supplied to the counter 44 and the number thereof will be the speed in feet per minute. As is explained in greater detail below in the more detailed description of the operation, the timer TD continues to time. At some time during the interval Tr it will supply a signal to the multivibrator 68 which thereupon closes the AND-gate 62 and actuates the sequencer PD. The sequencer PD then flips the multivibrator 52 to open the DOWN-gate 54 without immediate effect since the AND-gate 62 is closed.

The switch SW2A connects the programmer P1 to a second of the pickup devices 42 (illustrated as being device 42d) associated with a second roll which for illustrative purposes will be considered as being roll 24a. This roll 24a is likewise driven by a motor 32d through a speed reducer 34d. The reducer 34d also actuates a second pickup device 42d. At the time To (Tu+Tr) the timing device TD will actuate the bistable multivibrator 68 which in turn opens the AND-gate 62 of the programmer P1 to supply the pulses from device 42d to the counter 44. During the interval Tr, the sequencer PD will have actuated a bistable multivibrator 56 of a second programmer P2 to reverse the reversible or up-down counter 44 whereby the pulses derived from device 42d will be subtracted from the pulses supplied by the device 42c. As before, these pulses are supplied for a second predetermined time, in this case Td, after which the timing device TD actuates a bistable multivibrator 52 causing it to close the DOWN-gate 54, thereby terminating the flow of pulses to the counter 44. The counter now indicates the difference in feet per minute of the peripheral speeds of the rolls 22a and 24a. The stepped line 58 illustrates the pulses supplied to counter 44 from the device 42d.

As shown in FIG. 4, the speed of roll 24a is less than that of the roll 22a and the counter 44 reads, directly, the speed difference. If, on the other hand, the peripheral speed of the roll 24a was greater than that of roll 22a, the number of down pulses would be greater than the up pulses and the counter 44 unless otherwise controlled would count past 0000.0 and count down from the maximum reading (9999.9) of the counter. In such an event it would be necessary to subtract the counter reading from the maximum reading plus 0.1 to get the speed difference. For example, with the illustrated counter, the shown count would be subtracted from ten thousand which is one more than the maximum reading of nine thousand nine hundred ninety-nine and nine-tenths. This substraction can be avoided by reversing the counting direction of the counter 44 as it goes through its zero reading.

In accordance with this invention the occurrence of the first down pulse in excess of the up pulses (a reading of 9999.9) actuates a mono-stable multivibrator 60 of the programmer P2. The multivibrator 60 actuates the NOT-gate 408 of the programmer P1 to prevent further pulses from being supplied to the counter 44 and concurrently therewith actuates the gate 64 of the timing device TD to interrupt its interval timing operation. The multivibrator 60 also actuates the bistable multivibrator 56 for actuating the mounter 44 so that it will again count in the upward direction.

At the end of a preselected time the multivibrator 60 will return to its original condition to open the gates 408 and 64. Opening of the gate 408 automatically provides the counter 44 with an actuating pulse and actuates the counter 44 to its first digit position to indicate the count which was responsible for the actuation of programmer P2. Opening of the gate 408 also permits the programmer P1 to resume the supplying of pulses to the counter which pulses now actuate the counter 44 in an up direction. Opening of the gate 64 reactuates the timing device TD so that it continues to time the interval Td. At the end of time period Td, the counter reading will be equal to the difference in speed of the rolls 22a and 24a and the DOWN-gate will be closed as described when the number of down pulses were less than the number of up pulses. In order to indicate whether or not the counter 44 reverses during the down count, the monostable multivibrator 60 is caused to actuate a bistable multivibrator 66 from its initial condition in which the readout device R6 shows a plus sign into a second condition in which the device R6 shows a minus sign.

The sequencer PD comprises a biquinary type decade counter 70 which is like the decade counters D1–D5. It is sequenced by means of the bistable multivibrator 68 and reset as a consequence of its having completed a timing function. The terminals 524 and 525 of this counter 70 are connected to the bistable multivibrators 46 and 52 to alternately open the gates 48 or 54, so that the counter 44 will first count the pulses supplied from the one of the devices 42 as determined by the switch SW1A for a time interval as determined by switch SW1B and thereafter count the pulses supplied from the one of the devices 42 as determined by the switch SW2A for a time interval as determined by the switch SW2B. It will be noted that switches SW1A and SW1B are illustrated as being coupled together. This is desirable since with this arrangement the changing of the setting of the switch SW1A will automatically adjust the interval Tu. Likewise, the switches SW2A and SW2B are illustrated as being coupled for the same reasons. The counter 70 is actuated to flip the multivibrators 46 or 52 each time the multivibrator 68 is flipped to close the AND-gate 62. One portion of the AND-gate 62 is opened just at the zero time of the timing device TD to synchronize the operation of the counter 44 with the operation of the timing device TD and is closed as a consequence of the actuation of the multivibrator 68 as described. A second portion of gate 62 is kept open by the counter PD until both an up and a down count has been made and is thereafter closed to prevent further flow of pulses through the gate 62. It is reopened when the counter 70 is reset.

The counter 44 may include as many decade counters D as desired to indicate, with as great a degree of accuracy as is required, the peripheral speed of a roll and of the layer 9 traveling thereover. As shown, the counter 44 includes 4 digits above the decimal point and 1 below. The locations of the decimal point may be moved to the left or right by multiplying or dividing the time interval $Tu$ or $Td$ by 10. The counter 44 should always be capable of recording all of the up count pulses produced during a counting time interval without exceeding its maximum count.

Figure 5B:
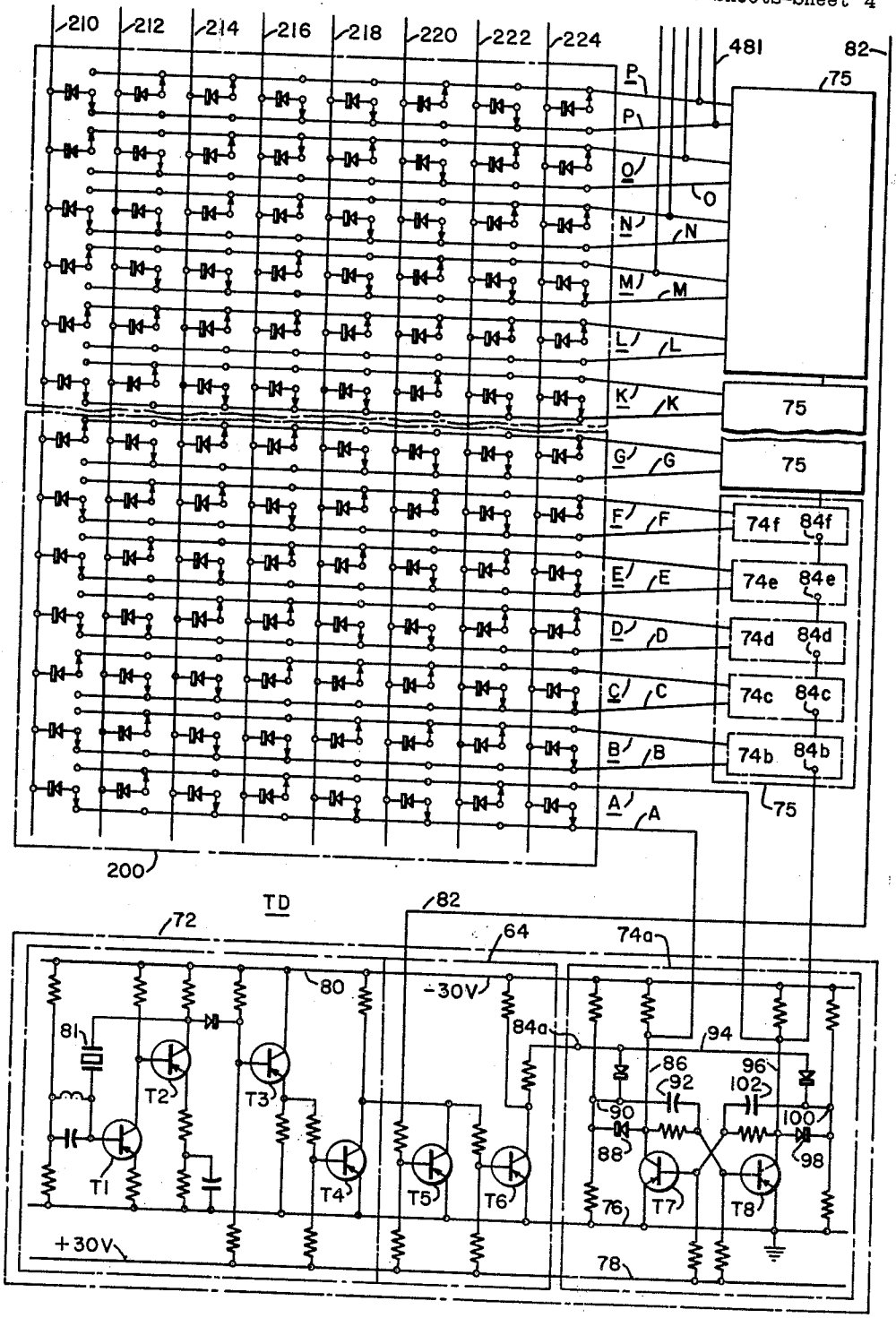
Figure 5C:
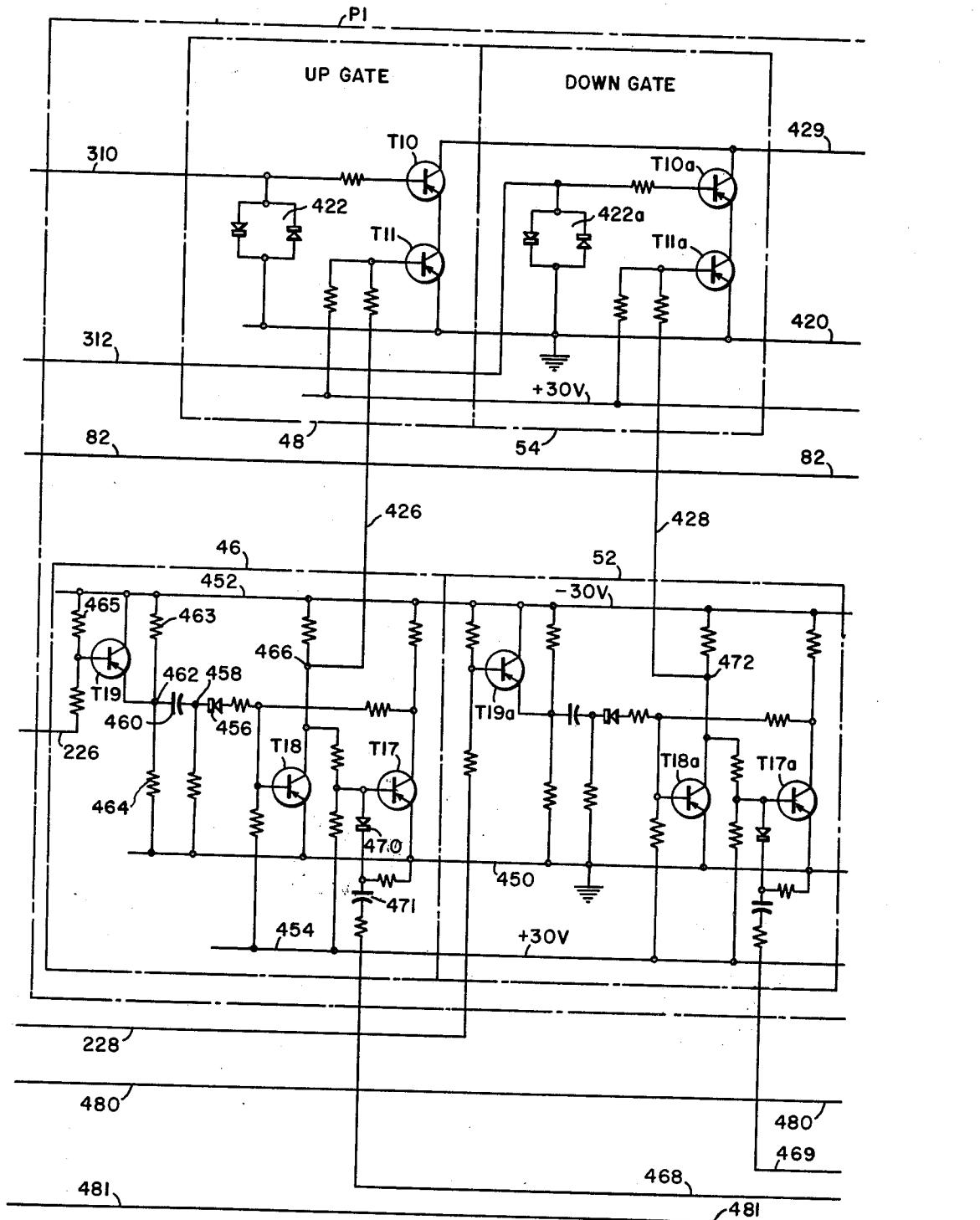
Figure 5D:
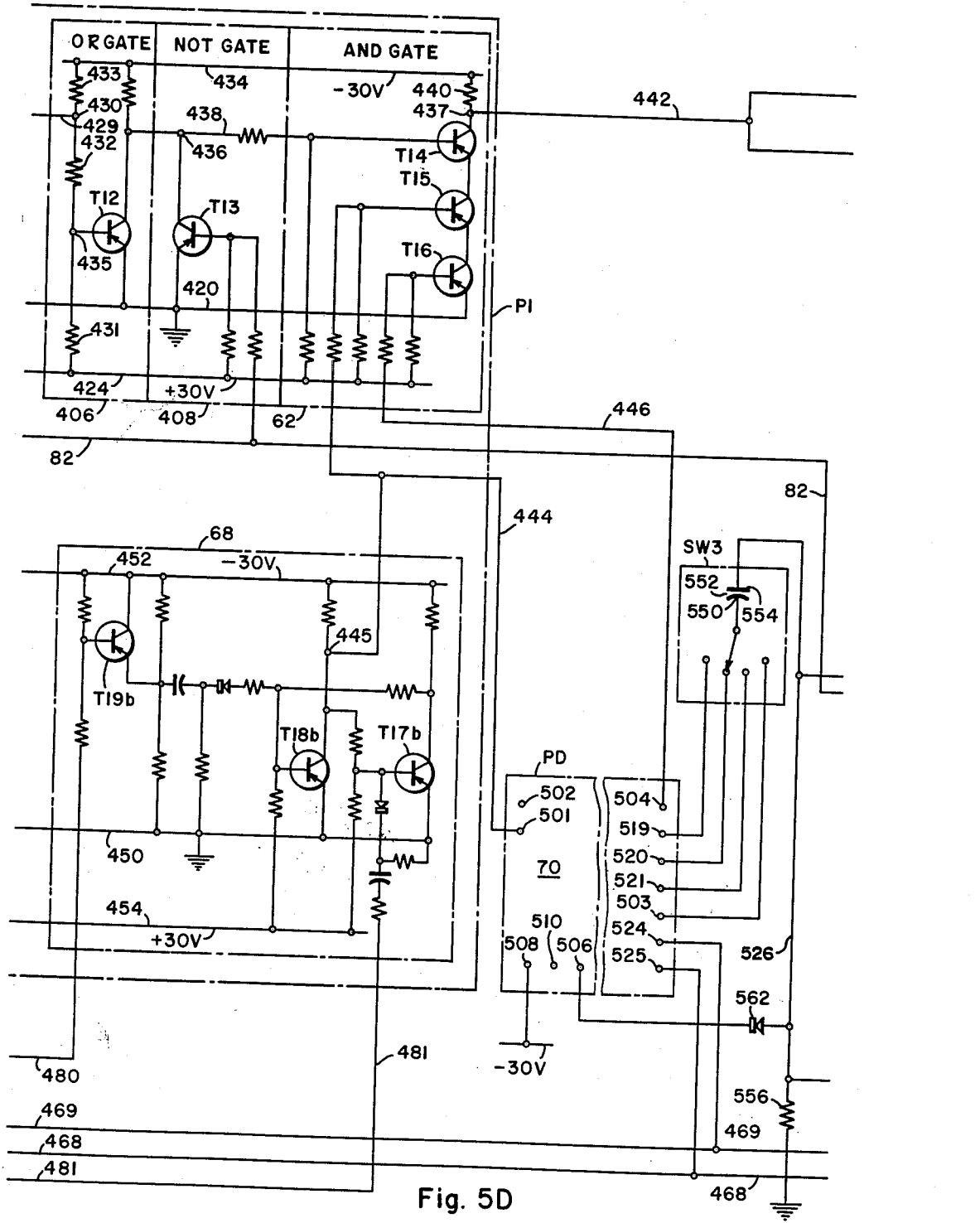
Figure 5E:
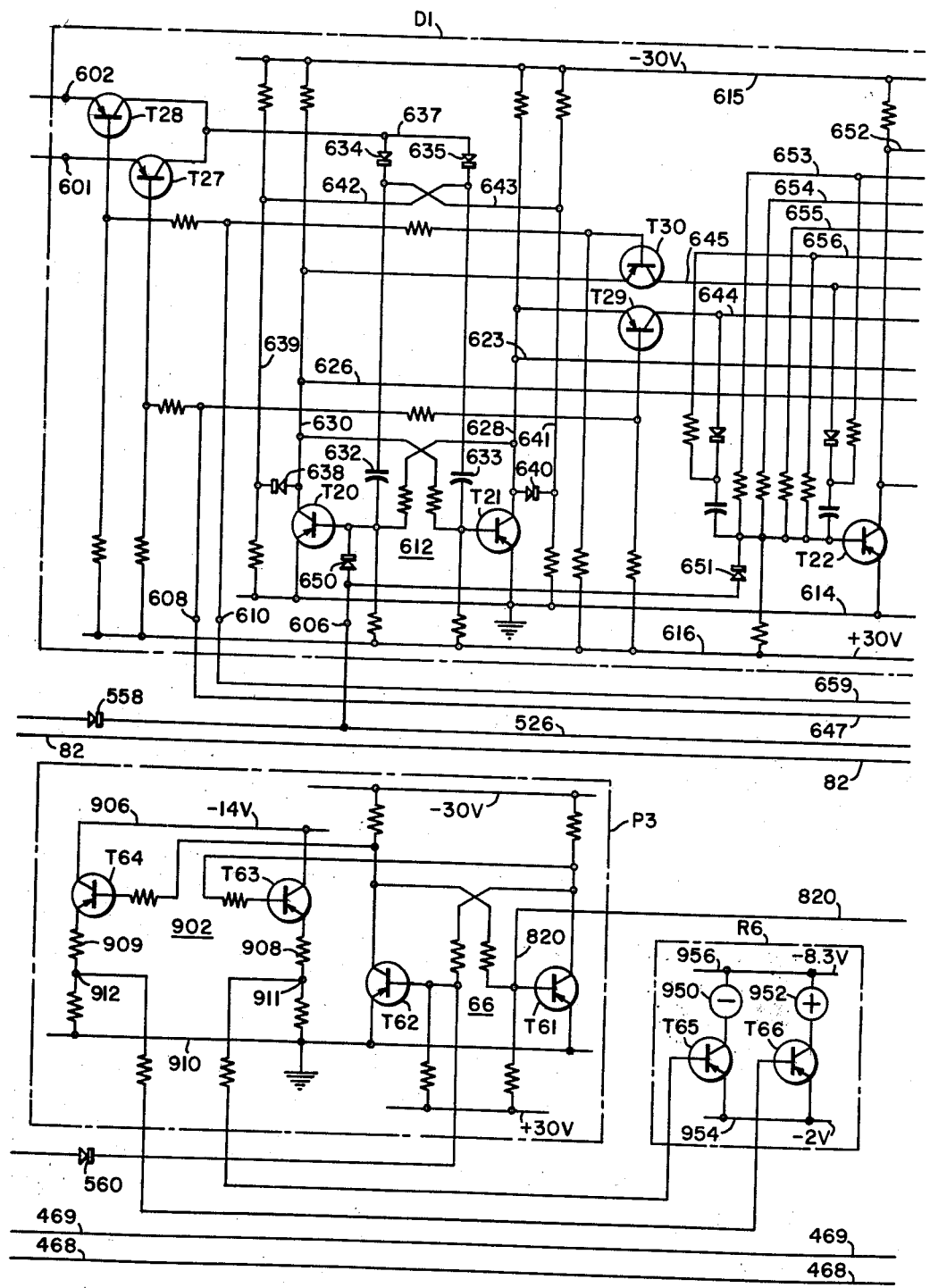
Figure 5F:
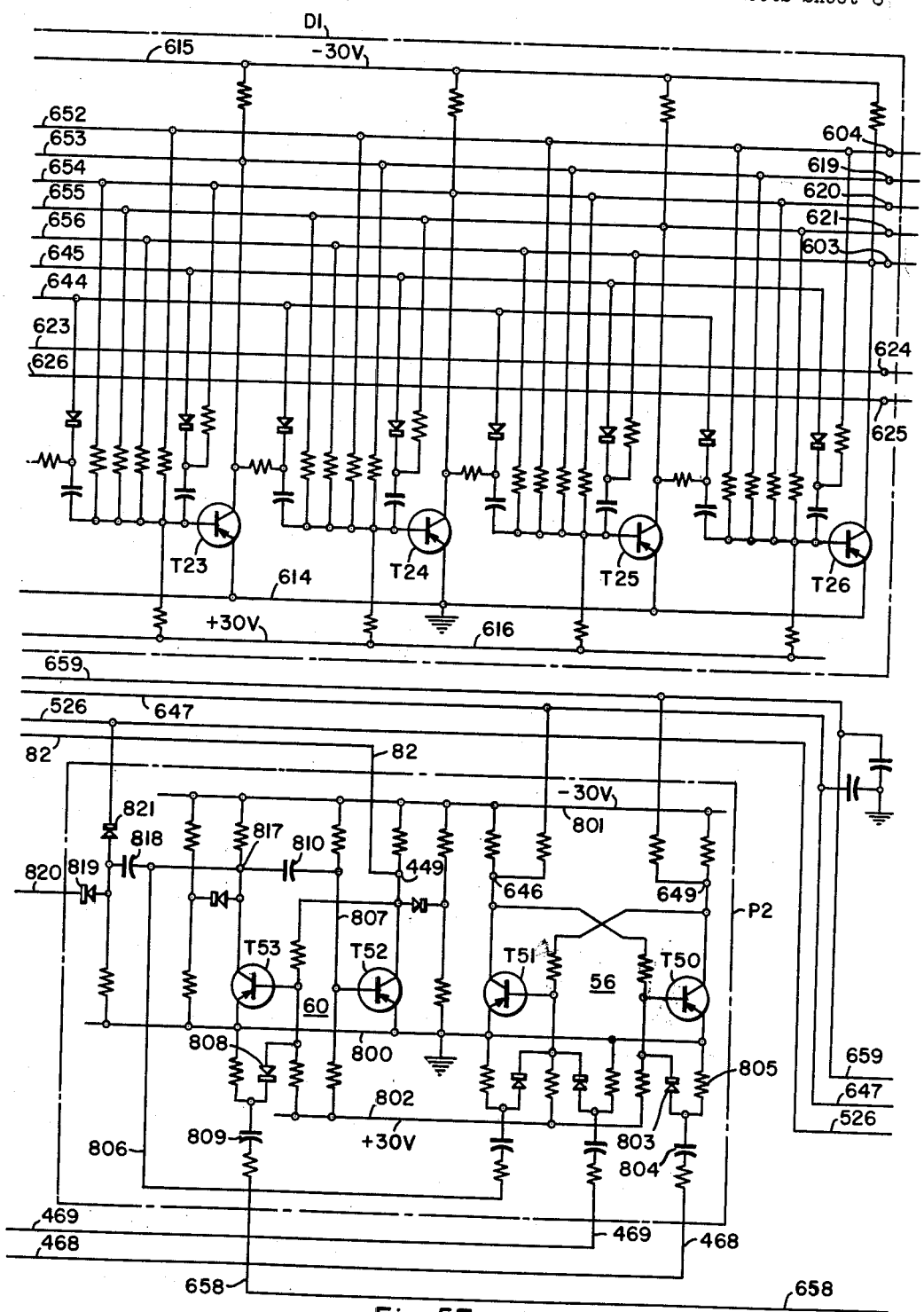
Figure 5G:
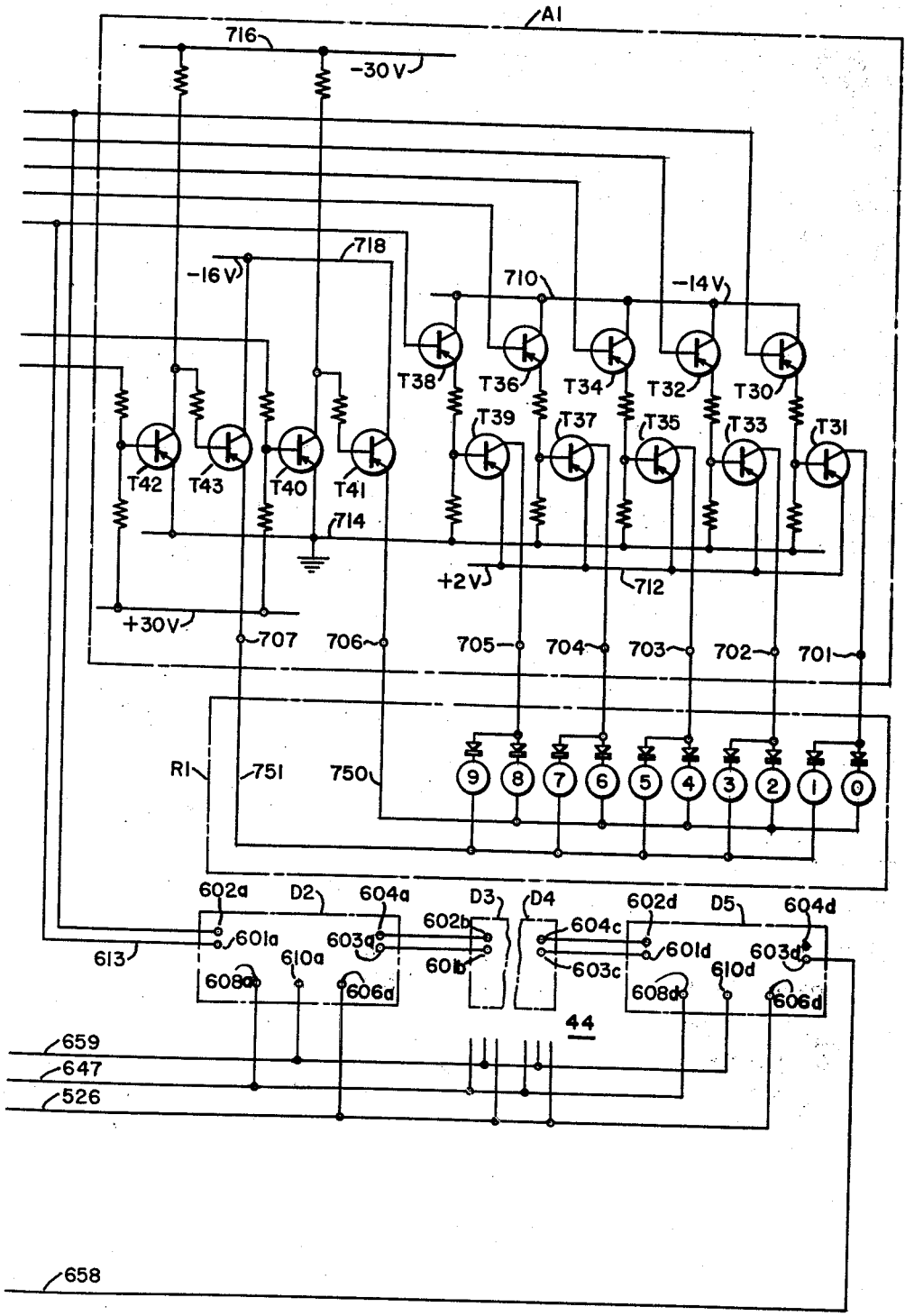

The timing device TD comprises an oscillator 72 which drives a group of 16 series connected bistable multivibrators 74 through the gate 64 and a matrix 200 (see FIG. 5B). Only one of these multivibrators 74a is shown in detail in order to simplify the drawings since all thereof are identical. Likewise, only one of the multivibrator groups 75 is broken down to show that it contains five multivibrators but each group 75 contains five of the multivibrators 74. If the speed at which the multivibrators are driven is held constant, the device may be used to measure time intervals. Any number of bistable multivibrators may be connected in series whereby the timing device TD can be made to time as long a time interval as desired.

We have found, however, that a timing device TD which includes a crystal controlled oscillator 72 oscillating at 12 kilocycles and driving 16 multivibrators will provide a sufficiently long time measuring period when 168 teeth are used on the gear 40, the shaft 36 operates at 6 times the speed of the roll, and the roll diameter is in the general range of 30 inches. Such a timing device TD provides a complete interval of approximately five and one half seconds or 65,536 cycles of the oscillator 72.

The oscillator 72 and bistable multivibrator networks 74 of the time delay device TD may best be described by reference to FIG. 5B which shows the schematic circuit diagram thereof. The oscillator 72 comprises a plurality of interconnected transistors T1, T2, T3 and T4 energized from potential buses 76, 78 and 80 which buses are maintained at zero or ground potential, plus 30 volts, and minus 30 volts respectively. The oscillating frequency is maintained at 12 kilocycles under the control of a crystal 81. The oscillator 72 should be of such a character that it will maintain its output frequency constant within 0.02% over a temperature range of from approximately 0 to 50° C. The oscillator details per se form no part of this invention and it is to be understood that any suitable oscillator having a constant fixed frequency output may be substituted therefor.

The oscillator output pulses are fed through the gate 64 to the first bistable multivibrator 74a. The gate 64 comprises a pair of transistors T5 and T6. The base electrode of the transistor T6 is connected through a resistor to the collector of the oscillator transistor T4 and to the collector of the transistor T5 which has its emitter electrode connected to the ground potential bus 76. The base of the transistor T5 is connected through a resistor to the positive bus 78 to normally maintain it in a non-conducting condition so that the base potential of the transistor T6 may be controlled by the oscillator transistor T4. The base of the transistor T5 is also connected through a resistor and a conductor 82 to the monostable multivibrator 60. Normally the potential of conductor 82 is maintained at or above ground or zero potential so that the transistor T5 is normally held non-conducting. Therefore, as long as transistor T5 remains non-conducting, the oscillator 72 continues to render the transistor T6 of the gate 64, conducting and non-conducting in phase opposition to the transistor T4.

The gate 64 is controlled by the conductor 82. When the potential of conductor 82 is lowered sufficiently, in a manner to be subsequently described, the transistor T5 will conduct. This conduction of transistor T5 raises the potential of the base of transistor T6 sufficiently so that the transistor T6 remains non-conductive irrespective of the conducting condition of transistor T4. This is the closed condition of gate 64.

The multivibrator 74a comprises a pair of transistors T7 and T8 which are connected between the potential buses 76 and 80. The base of the transistor T7 is connected to the collector of the transistor T8 and conversely. Each time the potential of the input terminal 84a is raised due to the conduction of the gate transistor T6, the conductive conditions of the transistors T7 and T8 will reverse. When these buses 76, 78 and 80 are initially energized, one of the transistors T7 and T8 will commence to conduct. For purposes of explanation let it be assumed that transistor T7 conducts and transistor T8 is blocked. The conducting transistor T7 maintains the potential of its collector and the conductor 86 which is connected thereto at substantially that of the bus 76. A rectifier 88 is connected between the conductor 86 and an intermediate potential point 90 of a voltage divider connected between the buses 76 and 80. Therefore, when transistor T7 conducts the point 90 will also be maintained substantially at ground potential.

The base of the transistor T8 is connected through a first resistor to the positive potential bus 78 and through a second resistor to the conductor 86. Therefore as long as the transistor T7 conducts to maintain the potential of the conductor 86 at ground potential, the voltage dividing effect of the resistors in the base circuit of the transistor T8 will hold the base potential sufficiently above the emitter potential to prevent the transistor T8 from conducting.

The base of the transistor T7 is connected through a first resistor to the positive potential bus 78 and through a second resistor to a conductor 96 connected to the collector of the transistor T8. With transistor T8 non-conducting, the potential of this conductor 96 is substantially below ground potential. The values of the last-named resistors are so related that the potential of the base of the transistor T7 will be maintained at a potential value to maintain conduction in transistor T7 when transistor T8 is non-conducting. The conductor 96 is connected through a rectifier 98 to an intermediate point 100 of a voltage divider connected between the buses 76 and 80. With the transistor T8 in a non-conducting condition, the conductor 96 is at a lower potential than point 100 and rectifier 98 acts as an open circuit so that point 100 will assume a potential dependent upon the values of the divider resistances.

One terminal of a capacitor 102 is connected to the base of the transistor T7 and the other terminal thereof is connected to point 100 whereby the capacitor 102 will charge to a potential equal to the difference between that of the base of transistor T7 and the point 100. With transistor T7 conducting, the voltage divider will maintain its point 100 at or below the potential of the base of the transistor T7. While this relationship is desirable, it may be varied somewhat so long as the potential point 100 is below ground potential an amount equal to or greater than the increase in potential necessary to cause the transistor T7 to decrease in conductivity.

When transistor T6 of the gate 64 conducts, the potential of the input terminal 84a and control bus 94 is raised from a value substantially below to substantially ground potential. This is without effect as far as the transistor T8 is concerned since the terminal of the capacitor 92 connected to point 90 is already at ground potential. The increase in potential of control bus 94 does, however, raise the potential of point 100 to substantially ground potential. Since the charge on capacitor 102 does not instantaneously change, the potential of the base of the transistor T7 is momentarily raised sufficiently to reduce the conduction through transistor T7. This causes the potential of the bus 86 to decrease. This results in a lowering of the potential of the base of the transistor T8 which will commence to conduct. Eventually through regenerative action transistor T8 will become fully conductive and transistor T7 will reach its fully blocked conditions. With the transistor T7 fully blocked, the potential of the conductor 86 is lower than the ground potential an amount sufficient to maintain transistor T8 conducting. With the transistor T8 fully conductive, the potential of the bus 96 increases substantially to ground potential thereby raising the potential of the base of the transistor T7 to maintain the transistor T7 blocked. The next time the gate transistor T6 conducts, the bus 94 will again be raised to substantially ground potential and the transistor T8 will cease conducting and the transistor T7 will again conduct in substantially the manner described above in connection with the conduction of transistor T8 and the rendering of the transistor T7 non-conducting. Subsequent increases in potential of bus 94 will continue to flip the multivibrator 74a.

Each multivibrator 74 is provided with a pair of output buses A, $\underline{A}$, B, $\underline{B}$, C, $\underline{C}$, D, $\underline{D}$, E, $\underline{E}$, F, $\underline{F}$, G, $\underline{G}$, H, $\underline{H}$, I, $\underline{I}$, J, $\underline{J}$, K, $\underline{K}$, L, $\underline{L}$, M, $\underline{M}$, N, $\underline{N}$, O, $\underline{O}$, and P, $\underline{P}$, which are connected to an adjustable time decoder or diode matrix 200. The matrix 200 comprises a plurality of input buses which extend across the matrix 200 in one direction and which are individually connected to the output buses of the bistable multivibrators 74. Buses H, $\underline{H}$; I, $\underline{I}$ and J, $\underline{J}$ are broken away to simplify the drawing. The matrix 200 is also provided with a plurality of output buses 210, 212, 214, 216, 218, 220, 222 and 224 which, as shown, extend at right angles to the input buses. These output buses are individually connected as shown to switch contacts in each of the switch sections SW1B and SW2B so that the output conductors 226 and 228 of the switch sections SW1B and SW2B may be selectively connected to any of the buses 210–224.

As is illustrated, each of the output buses 210–224 is individually connectable with either bus of each of the pairs of input buses A, $\underline{A}$ to P, $\underline{P}$ through individual ones of the rectifying devices which are connected to the respective said output bus. For a purpose which will become apparent as the description proceeds, these rectifiers prevent any flow of current from the output bus into any of the input buses or between various of the input buses. The connections between the output buses and the input buses can be made in any desired manner as by single-pole double throw switches or by providing movable links. Such switching devices per se are old in the art and suffice it to say that the switching devices are arranged so that the output bus can be connected to only one of each of the pairs of input buses. It will be appreciated that the number of output buses 210–224 may be altered to suit the number of required timing intervals. In the illustrated instance, eight are used, one of each of the illustrated pulsing devices 42a–42h.

It will readily be appreciated that since all of the multivibrators 74 are connected in sequence, the first to be actuated multivibrator 74a will be actuated at one-half the frequency of the oscillator 72, the second multivibrator 74b will be operated at one-quarter frequency, the third 74c at one-eighth frequency, the fourth 74d at one-sixteenth frequency, with the sixteenth thereof operating at 1/65,536 of the frequency of the oscillator. Since the oscillator operates at 12,000 cycles per second the multivibrator having the output buses P, $\underline{P}$ will operate at a frequency which is slightly over 0.18 cycle per second which is almost exactly 11 cycles per minute. Approximately 5.46 seconds are required for the oscillator to drive all of the multivibrators 74 from a first or initial condition through their entire cycle back again to the first or initial condition. This time period is referred to as the time $T_o$ of a complete timing cycle of the timing device TD. It will now be appreciated that the apparatus TD may be used to accurately time any desired time interval between 0.00008333 seconds and 5.46 seconds in incremental steps of 0.0000833 seconds.

The timing apparatus TD is correlated with respect to the pulsing apparatus, as set forth above, to terminate the flow of pulses when the counter indicates the feet per minute speed of the periphery of the roll being measured. The total number of pulses (N) supplied to the counter equals the feet per minute (R) of the layer 9 or of the periphery of the roll under measurement and also equals the frequency of the pulses ($F_p$) multiplied by the time in seconds ($t$) that these pulses are being supplied.

$$N = R = F_p \cdot t \qquad (1)$$

Thus if the total number of pulses are to equal the feet per minute peripheral speed of the roll or the speed of the layer 9, the time interval is dependent upon the number of pulses which occur for each foot of the layer 9 or foot of driven periphery which passes a fixed point. In the arrangement shown, one pulse is supplied as a consequence of the passage of each tooth past its respective pick-up device 42. This occurs at a frequency ($F_0$) which is inversely proportional to the circumference of the roll ($\pi D/12$) and directly proportional to the number of gear teeth (T) and directly proportional to the gear ratio (G) when D is in inches and when, as in this case, the gear rotates at a speed which is faster than that of the roll. This may be represented by the following formula.

$$F_p = \frac{12RGT}{60\pi D} \qquad (2)$$

When the frequency of the time base is $F_t$ in cycles per second, the number of base signals $N_o$ for a time $T_o$ in seconds is $$T_o = \frac{N_o}{F_t} \qquad (3)$$

Substituting for $T_o$ and $F_p$ in Formula 1

$$R = \frac{12RGT}{60\pi D} \cdot \frac{N_o}{F_t} \qquad (4)$$

Solving for $N_o$ $$N_o = 5\pi \frac{F_t D}{GT} \qquad (5)$$

Since it is desired to measure to an accuracy of 0.1 foot per minute each count should represent 0.1 foot of peripheral speed of the associated roll and to use $f$ in kilocycles $$N = 10 N_o \qquad (6)$$

$$1000 f = F_t \qquad (7)$$

Substituting (6) and (7) in Equation 5

$$N = 50,000 \pi \frac{fD}{GT} \qquad (8)$$

or $$N = 157,079.6 \frac{fD}{GT}$$

In order to set the switches or links in the matrix 200 the number N is first divided by 2. If the result has no remainder, then the first switch should be set to the unbarred conductor and likewise down the line to P, $\underline{P}$. For example, suppose that the diameter D of the selected roll equals 31.885 inches, the number of teeth T on the pulse wheel equals 168, the gear ratio G is equal to 6, the oscillator frequency $f$ is 12 kilocycles, N would equal 59,624. The quotient of the first division is a whole number with no remainder and the first link would be attached to the A bus. The second division also is even and the second link would be attached to the B bus, the third link would likewise go to the C bus, the fourth division is uneven with a remainder of 1 and this link should be, as shown, attached to the D bus, the next link is attached to the E bus, the next three links are attached to the F, G and H buses respectively, the next three links are connected to the I, J and K buses, the next link to the L bus, the next link to the M bus and the last three links to the N, O and P buses respectively. This arrangement in connection with output bus 214 is connected by switch SW1B to the conductor 226.

Each of the pick-up devices 42a–42h are individually connected to the switch contacts of each of the switch sections SW1A and SW2A whereby the pulses from any desired pick-up device may be applied to the output conductors 310 or 312 as may be desired. Preferably the switches SW1A and SW1B are mechanically interconnected so that as the switch SW1A is switched from one pulse producing device to another, the time signal will be correspondingly changed. Similarly, the switch sections SW2A and SW2B are mechanically interconnected together.

The pulse signals from the selected devices 42 are supplied through the conductors 310 or 312 to the first programming unit P1 which as described above includes the UP-gate 48, the DOWN-gate 54, an OR-gate 406, a NOT-gate 408, and the AND-gate 62 as well as the bistable multivibrators 46, 52, and 68. The UP-gate and DOWN-gate 48 and 54 are identical in construction. Each comprises a pair of series connected transistors T10–T11 and T10a–T11a. The bases of the transistor T10 and T10a are individually connected through current limiting resistors to the output conductor 310 and 312 respectively of the switch sections SW1A, or SW2A. The bases of these transistors are also connected to the zero potential bus 420 through a network 422 and 422a respectively. Each of these networks comprise a pair of back-to-back connected rectifiers. Each of the pickup devices 42 is connected to a ground bus which is in ohmic connection with bus 420 whereby the potentials generated by the pickup devices 42 may be applied across the networks 422 and 422a. The networks 422 and 422a each limit the magnitude of the voltage which may be applied by the pickup device to the bases of the transistors T10 and T10a as the case may be. At one polarity of the alternating voltage developed by the device 42 the transistor T10 or T10a connected thereto is rendered conductive and at the opposite potential the device insures that the connected transistor T10 or T10a remains non-conductive. It will be appreciated, however, that unless the associated transistor T11 or T11a is in a conductive condition, the associated transistor T10 or T10a will be prevented from conducting. When the respective said transistor T11 or T11a is held conductive, the associated transistor T10 or T10a is caused to conduct each time that the connected pickup device 42 is actuated as a consequence of the passage of a gear tooth thereby.

The bases of the transistors T11 and T11a are individually connected through first resistors to a potential bus 424 which is maintained at 30 volts positive with respect to the ground bus 420 and are also individually connected through second resistors by means of conductors 426 and 428 to the multivibrators 46 and 52. As will be subsequently explained, the multivibrators 46 and 52 will vary the potentials of the conductor 426 and 428 respectively from substantially ground potential to a potential which is substantially below ground potential.

During the potential excursion of the conductor 426 to substantially ground potential the transistor T11 will be held against conduction, however, during the excursion of the conductor 426 to a potential substantially below ground potential the transistor T11 will be rendered conductive. With both of the transistors T10 and T11 or T10a and T11a conductive, the common output bus 429 connected to the collector of each of transistors T10 and T10a is maintained substantially at ground potential. When the potential of output bus 429 is raised to ground potential it raises the potential of terminal 430 of the OR-gate 406 sufficiently to render transistor T12 non-conductive.

The terminal 430 is located intermediate the resistors 432 and 433 of a plurality of series connected resistors 431, 432, 433 connected between the ground bus 420 and the −30 volt bus 434 in the order named. The transistor T12 has its emitter directly connected to the bus 420, its collector connected through a current limiting resistor to the negative bus 434, and its base connected to a terminal 435 located between the resistors 431 and 432. The values of the resistors 431–433 are so chosen that as long as both gates 48 and 54 are closed whereby the bus 429 is effectively disconnected from the bus 420 and at a potential substantially below ground potential, the potential of the base of the transistor T12 is maintained at a potential with respect to the potential of the emitter of transistor T12 to hold the transistor conducting. When, however, the potentials of the bus 429 and the terminal 430 are raised to substantially ground potential, the potential of the base of the transistor T12 will be raised sufficiently to cause the transistor T12 to block. When the transistor T12 blocks, the terminal 436 which is connected to the collector of transistor T12 is disconnected from the bus 420 and the potential of the terminal 436 is maintained substantially below ground potential; provided, however, that the transistor T13 of the NOT-gate 408 is likewise non-conducting as will be discussed below.

The AND-gate 62 comprises three transistors T14, T15 and T16 which have their main electrodes series connected between the ground bus 420 and the negative bus 434 in series with a loading resistor 440. The output conductor 442 of the programming unit P1 is connected to a terminal 437 intermediate the collector of transistor T14 and the resistor 440. With this arrangement, the potential of the conductor 442 will be varied from substantially that of the bus 434 (no conduction through the transistors T14–T16) to substantially that of the bus 420 with the transistors T14, T15 and T16 conducting.

The bases of the transistors T14–T16 are individually connected to the positive potential bus 424 through first resistors and individually connected through second resistors to control conductors 438, 444 and 446. The conductor 438 connects the base of transistors T14 to the terminal 436, conductor 444 connects the base of transistor T15 to one output terminal 445 of the multivibrator 68, and the conductor 446 connects the base of the transistor T16 to an output terminal 504 of the counter 70.

The NOT-gate 408 comprises a transistor T13 having its emitter connected to ground bus 420 and its collector connected to the terminal 436 in shunt circuit with the transistor T12 of the OR-gate 406. In order to control the conductive condition of the transistor T13, its base is connected through a first resistor to the positive bus 424 and through a second resistor and control conductor 82 to an output terminal 449 of the monostable multivibrator 60. As will be explained below, the transistor T52 of the multivibrator 60 is normally conducting to maintain the output terminal 449 and conductor 82 substantially at ground potential. This will normally maintain the transistor T13 non-conductive. When this multivibrator 60 is actuated, as described above, upon the occurrence of the counter 44 counting downwardly beyond its zero indication, the transistor T52 becomes non-conducting for a predetermined time interval thereby reducing the potential of the conductor 82 below ground potential to cause transistor T13 to conduct for this time interval. When transistor T13 conducts the potential of the conductor 438 is maintained substantially at ground potential to prevent conduction of transistor T14 irrespective of the operation of transistor T12.

It will now be appreciated that a pulse generated by one of the pickup devices 42a–42b, depending upon the setting of the switch SW1A, will be passed through the conductor 310 to the programming unit P1. When the UP-gate 48 is open (transistor T11 held in a conductive condition) transistor T10 will be pulsed into conduction each time that one of the gear teeth of the associated toothed gear 40 passes the pickup device. This will periodically raise the potential of the terminal 430 causing the transistor T12 to conduct periodically. Conducting of the transistor T12 raises the potential of the conductor 438 to render transistor T14 non-conductive. Upon the reblocking of transistor T12, the transistor T14 will again be rendered conductive and will then conduct providing that at this time, the transistors T15 and T16 are also in a conductive condition. The conduction of the transistors T14–T16 raises the potential of the output bus 442 to actuate the multivibrator 612 of the first decade counter D1.

The monostable multivibrators 46, 52 and 68 are all identical in construction and a detailed description of one thereof is all that is deemed necessary. Like elements in multivibrators 52 and 68 will be given the same reference characters as in the multivibrator 46 with subscript *a* or *b* added. Each of these monostable multivibrators includes a pair of transistors T17 and T18 having their emitters connected to a ground potential bus 450 and their collectors connected through individual resistors to the —30 volt bus 452. The base of the transistor T17 is connected to the positive potential bus 454 through a first resistor and to the collector of the transistor T18 through a second resistor. The relative values of these resistors are such that as long as the transistor T18 conducts and maintains its collector substantially at ground potential the potential of the base of the transistor T17 will be sufficiently elevated to maintain the transistor T17 non-conducting.

The base of the transistor T18 is likewise connected through a first resistor to the positive potential bus 454 and through a second resistor to the collector of the transistor T17. The relative values of these resistors are similar to those in the base circuit of the transistor T17. The base of the transistor T18 is additionally connected through a third resistor and a rectifier 456 to one terminal 458 of a capacitor 460. The other terminal of the capacitor 460 is connected to the common point 462 of a pair of resistors 463 and 464 series connected between the buses 452 and 450. A transistor T19 is shunt connected with the resistor 463 with its emitter connected to point 462 and its collector connected to the bus 452. The base of the transistor T19 is connected through a resistor 465 to the bus 452 and through the output conductor 226 to the switch section SW1B. The output terminal 466 of the multivibrator 46 is connected through a resistor to the base of the transistor T11 of the UP-gate 48 by the conductor 426.

Transistors T17 and T18 alternate in conduction, one being non-conductive while the other conducts. As long as the transistor T18 continues to conduct the potential of its collector will be substantially that of the ground bus 450. Since the resistors connected to the base of the transistor T17 form a voltage divider, one end of which is substantially at ground potential and the other end of which is substantially at the potential of the bus 454, the base of the transistor T17 will be maintained sufficiently elevated to maintain the transistor T17 non-conducting.

The multivibrator 46 will remain in this condition until actuated as a consequence of a reduction in potential of the conductor 468 which connects the base of the transistor T17 to an output terminal 525, of the sequencing switch or counter 70. A rectifier 470 and a capacitor 471 are series connected between the base of transistor T17 and the conductor 468. When the potential of conductor 468 is reduced below ground potential by the counter 70, the potential of the base of the transistor T17 is momentarily lowered and transistor T17 conducts. Conduction of transistor T17 raises the potential of its collector substantially to ground potential. This raises the potential of this base of the transistor T18 sufficiently to cause the transistor T18 to cease conducting and causes its collector potential to fall below ground potential. The reduction in potential of the collector of transistor T18 will act through the voltage dividing resistors associated with base electrodes of the transistor T17 to lower the base potential sufficiently to maintain transistor T17 conducting after capacitor 471 recharges. The multivibrator 46 will remain in this condition until actuated by a time responsive signal from the timing device TD.

The conductor 226 is connected to one of the output conductors 210–224 of the matrix 200 through the switch section SW1B. In the position shown, the conductor is connected to output bus 214. The switches in the matrix 200 which connect its input buses to its output buses 210–224 are so arranged that only at one particular time in the cycle of the timing device TD will the potential of the bus 214 be at a reduced potential. At all other times one or more of the connected input buses will maintain this output bus 214 at ground potential. The value of the resistors 463 and 464 are so chosen that with the conductor 226 at ground potential the base of the transistor T19 will be at a potential sufficiently elevated to maintain transistor T19 blocked. When transistor T19 conducts, it connects the terminal or common point 462 directly to the negative potential bus 452. This momentarily lowers the potential of the capacitor terminal 458 and of the base of the transistor T18 sufficiently to cause transistor T18 to conduct. When transistor T18 conducts the potential of its collector rises substantially to ground potential. This raises the potential of the base of the transistor sufficiently to render transistor T17 blocked. Because of the presence of the rectifier 456, any subsequent blocking of the transistor T19 and increase in potential of the point 462 is ineffective to terminate conduction of the transistor T18. The bistable multivibrator will remain in this condition until actuated by negative signal applied by the conductor 468 from the counter 70 through the rectifier 470 and capacitor 471.

All of the decade counters D1–D5 are of identical construction and only one thereof is shown in detail for purpose of simplification of the drawings. When referring to the construction of the counters generally the reference characters pertaining thereto will be used without subscripts. When it is desired to refer to particular ones of the counters the numerals without subscripts will be used in connection with the counter D1 and subscripts *a*, *b*, *c*, and *d* will be applied to the reference characters associated with the counters D2, D3, D4 and D5 respectively. Each of the decade counters includes an "up" input terminal 601, a "down" input terminal 602, an "up" output terminal 603, and a "down" output terminal 604. Each of the decade counters D1–D5 are further provided with a reset input terminal 606, an "up" control input terminal 608, and a "down" control input terminal 610. Counting is accomplished by changing the relative conductive conditions of a plurality of transistors T20, T21, T22, T23, T24, T25 and T26. An "up-only" counting decade counter substantially like the counters D1–D5 and the counter 70 is shown in our copending application Serial No. 6,268, filed February 2, 1960, now Patent No. 3,058,-223, and entitled "Measuring Apparatus."

The transistors T20 and T21 are connected together to provide a bistable multivibrator 612. The transistors T22–T26 are connected together in a ring-of-five. Four of the transistors T22–T26 normally conduct and one is normally blocked. Each time a positive pulse is applied to one of the input terminals 601 or 602, the conductive condition of the transistors T20 and T21 are reversed.

The first substantial difference between the decade counter D1 and the counter shown in the said copending application is the addition of a control bus 645 which is connectable to the collector of transistor T20 and the addition of transistor switches T29 and T30 to select which of the control buses 644 or 645 connect the multivibrator 612 to the ring-of-five so that it may be selectively actuated by either the conduction of the transistor T20 or of the transistor T21. The second substantial difference is the addition of a plurality of networks (each comprising a rectifier series connected with a capacitor) connected between the control bus 645 and the bases of each of the transistors T22–T26 and resistors which connect the collectors of transistors T22–T26 to the common connections between the rectifier and capacitor of the networks connected to the bases of transistors T26, and T22–T25 respectively, as will be apparent from a comparison of the counter D1 with the counter 34 of the copending application Serial No. 6,268, so that the non-conducting condition progresses upwardly through the ring-of-five transistors T22–T26 when transistor T29 conducts in which event the counter is counting upwardly or when transistor T30 conducts in the opposite direction through the ring-of-five transistors in the direction of transistor T26 to transistor T22 in which event the counter is counting downwardly.

The decade counter D1 is provided with additional output terminals 619, 620, 621, 624 and 625. Output terminals 624 and 625 are respectively connected to the collectors of the transistors T21 and T20 by conductors 623 and 626. Conductors, connected to the output terminals 603, 604, 619, 620, 621, 624 and 625, lead from the decade counter D1 to an amplifier and decoder A1. The decoder amplifier A1 amplifies and decodes the output signal of the decade D1 and energizes the proper one of the lamps of the indicating device R1 to indicate the number of pulses which have been supplied to the decade counter D1.

Specifically, the decade counter D1 includes a ground potential bus 614, a negative potential bus 615 which may be maintained at 30 volts negative with respect to ground potential and a positive potential bus 616 which may be maintained at 30 volts positive with respect to ground. The transistors T20 and T21 and their associated circuitry comprise the bistable multivibrator 612 while the transistors T22–T26 and their associated circuitry comprise the ring-of-five portion of the decade D1.

The transistors T20 and T21 each have their emitters connected to the ground potential bus 614, and their collectors individually connected through individual resistors to the negative bus 615. The base of the transistor T20 is connected to the positive bus 616 through a first resistor and through a second resistor to a bus 628 connected to the collector of the transistor T21. Likewise, the base of the transistor T21 is connected to the positive bus 616 through a first resistor and through a second resistor to a bus 630 connected to the collector of the transistor T20. The bases of the transistors T20 and T21 are each connected through a capacitor series connected with a rectifier 632–634 and 633–635 to the multivibrator input conductor 637. This input conductor is selectively connected to the input terminals 601 and 602 by means of transistors T27 and T28.

The collector of the transistor T20 is connected through a rectifier 638 to an intermediate potential section 639 of a potential divider connected between the buses 614 and 615. Likewise, the collector of the transistor T21 is connected through a rectifier 640 to an intermediate potential section 641 of a second potential divider connected between the buses 614 and 615.

Conductors 642 and 643 respectively connect the sections 639 and 641 with the common connection of the capacitor rectifier combination 633–635 and 632–634 respectively.

Let it be assumed that the transistor T21 is conducting and the transistor T20 is blocked. Under these conditions, the potential of the bus 630 is substantially below ground potential and the potential of the bus 628 is substantially at ground potential. Since the potential of bus 630 is at or slightly below that of the connection 639, the rectifier is non-conducting and the connection 639 is effectively disconnected from the bus 630. This is, however, not the case with the rectifier 640 which at this time will be conducting because the bus 628 is more positive than the connection 641 and the rectifier 640 conducts to maintain the potential of the connection substantially that of the bus 628.

The multivibrator 612 of the decade D1 is actuated by abruptly raising the potential of the conductor 637 to substantially ground potential. This abruptly raises the potential of the terminal of the capacitor 633 adjacent the rectifier 635 and since the capacitor charge cannot instantaneously change, this increase of potential will raise the potential of the base of the transistor T21 sufficiently to render it non-conducting. Since the terminal of the capacitor 632 which is connected to the rectifier 634 was already at ground potential, the increase in potential of the conductor 637 to ground potential had no effect upon the potential of the base of the transistor T20. However, as soon as the transistor T21 became non-conductive the potential of the collector bus 628 dropped from substantially that of the ground bus 614. This lowered the potential of the base of the transistor T20 to cause it to conduct. Conduction of the transistor T20 causes the potential of the collector bus 630 to increase whereby the voltage dividing resistors associated with the base of the transistor T21 increase the potential of the base of the transistor T21 and it continues to remain in a non-conducting condition irrespective of the subsequent change in the charge of the capacitor 633 and/or the potential of the input conductor 637. The voltage dividing resistors associated with the base of the transistor T20 are now connected between the buses 615 and 616 and are related in magnitude to maintain the base of transistor T20 at a potential to maintain this transistor T20 fully conductive. Subsequent successive pulses which raise the potential of the conductor 637 operate in exactly the same described manner to render the transistor T20 blocked and the transistor T21 conducting and vice versa in sequence.

The transistors T22–T26 which are connected into a "ring-of-five" in which four thereof are always conducting have their collectors and emitters connected between the buses 614 and 615 through individual voltage dropping resistors. Each of the bases of the transistors T22–T26 is individually connected through a voltage dividing resistor to the positive bus 616. The base of each of the transistors T22–T26 is connected through an individual current limiting resistor to the collector of each of the four other of the transistors T22–T26. The base of each of the transistors T22–T26 is individually connected to an up input bus 644 through networks comprising a capacitor series connected with a rectifier for actuation of the ring-of-five transistors for up-counting. The base of each of the transistors T22–T26 is also individually connected to a down input bus 645 through networks comprising a capacitor series connected with a rectifier for actuation of the ring-of-five transistors for down-counting. The common point between the capacitor and rectifier combination which connects the base of the transistor T22 to the up bus 644 is connected through a resistor to the collector of the transistor T26. Likewise, the common points between the capacitor-rectifier combination connected between the bases of the transistors T23–T26 and the bus 644 are individually connected to the collectors of the transistors T22–T25 respectively. The common points between the capacitor-rectifier combinations connecting the bases of the transistors T22–T26 to the input bus 645 are similarly connected to the collectors of the transistors T23–T26 and T22 respectively.

For up-counting the transistor T29 is rendered conducting to connect the up input bus 644 to the collector bus 628 and the transistor T27 is rendered conducting to connect the up input terminal 601 to the input conductor 637. For down-counting the transistor T30 is rendered conducting to connect the down input bus 645 to the collector bus 630 and the transistor T28 is rendered conducting to connect the down input terminal 602 to the input conductor 637. It will be appreciated that solely the up transistors T27 and T29 or the down transistors T28 and T30 are to be rendered conducting at one time.

The bases of the up transistors T27 and T29 are individually connected through first resistors to the positive bus 616 and through second resistors to the up control input terminal 608 which terminal is connected to the output terminal 646 multivibrator 56 by a conductor 647. At one energized condition of the multivibrator 56 the bus 647 is maintained at an elevated potential which is substantially that of the ground bus 614 to hold the transistors T27 and T29 blocked. At the other energized condition of the multivibrator 56 the bus 647 is maintained at a depressed potential which is below that of the ground bus 614 to hold the transistors T27 and T29 conductive. The bases of the down transistors T28 and T30 are similarly connected through first and second resistors to between the positive potential bus 616 and the down control input terminal 610. The terminal 610 is connected by a conductor 659 to output terminal 649 of the multivibrator 56 whereby the potential of the terminal 610 is controlled between an elevated or ground value and a lower or below ground value to render the transistors T28 and T30 non-conducting and conducting in opposite relation to the transistors T27 and T29 for down and up counting of the decade D1.

The initial or zero count condition of each of the decades D1–D5 is with the transistors T21 and T23–T26 conducting and transistors T20 and T22 blocked or non-conducting. In order to obtain this condition the decades are provided with a reset terminal 606. The bases of the transistors T20 and T22 are individually connected to this terminal 606 through rectifiers 650 and 651. The terminal 606 is connected to a reset conductor 526 which, as will be described below, may be raised from a substantially ground potential to substantially above ground potential. When this occurs the bases of the transistors T20 and T22 are increased in potential sufficiently to cause these transistors T20 and T22 to block. As described above, this automatically results in transistor T21 becoming conductive, if it wasn't already, and automatically results in the conduction of transistors T23–T26 if these transistors are not already conducting.

Let it be assumed that the decade D1 has been reset and that transistors T21 and T23–T26 are conducting and the transistors T20 and T22 are in a blocked condition. With the transistors T23–T26 conducting, the base of the transistor T22 will be held at a potential which is sufficiently elevated with respect to the bus 614 to maintain the transistor T22 non-conducting. This is because that all four of the collector buses which are connected to the base of transistor T22 are at ground potential. Since transistor T22 is not conducting only three of the four collector buses which are connected to the bases of the transistors T23–T26 are at ground potential. Each of these bases is at the same potential which is sufficiently elevated to cause these transistors T23–T26 to continue to conduct.

In describing the operations of the ring-of-five transistors T22–T26 it will be assumed that the up-count controlling transistors T27 and T29 are conductive and a pulse is applied to the conductor 637. This pulse causes the transistor T20 to conduct and transistor T21 to block without effect on the transistors T22–T26. The next pulse on the conductor 637 renders the transistor T20 blocked and transistor T21 conductive. Conduction of transistor T21 raises the potential of the conductor 644 to substantially that of the ground potential bus 614. Prior to the re-conducting of transistor T21, the potentials of the terminals of the capacitors connected to the collector buses 653–656 which are connected to the collectors of the conducting transistors T23–T26 respectively are substantially at ground potential. The terminal of the capacitor (which connects the base of the transistor T23 to the collector of the transistor T22) which is connected to the collector of the transistor T22 and the collector bus 652 will be at a potential substantially below ground potential. The raising of the potential of conductor 644 substantially to ground potential has no effect on the capacitors connected between this conductor 644 and the bases of the transistors T22 and T24–T26. The raising of the potential of the conductor 644 does, however, momentarily elevate the potential of the base of the transistor T23 sufficiently to cause it to cease conducting.

When this occurs the potential of the collector bus 653 associated with the transistor T23 falls and removes one of the four ground potential connections which previously existed on the base of the transistor T22. Since three grounded connections are insufficient to maintain any of the transistors T22–T26 non-conductive, transistor T22 will now conduct. When transistor T22 conducts, the potential of its collector and the associated collector bus 652 increases to substantially that of the ground bus 614. Bus 652 is connected to the base of each of the transistors T23–T26 and when its potential is raised adds a ground connection to each of the transistors T23–T26. Since the blocking of the transistor T23 and the consequent reduction in potential of its collector bus 653 reduced the number of ground connections of the bases of transistors T24–T26 to two, the additional connection due to the conductors of transistor T22 merely returns the number of ground connections of the bases of the transistors T24–T26 to three and these transistors will continue to conduct. The blocking of the transistor T23 removed one of the four ground connections of the base of the transistor T22 but since the collector bus 652 is not connected to the base of the transistor T22 the rise in potential thereof does not add a fourth ground connection to the base of transistor T22 and it continues to conduct.

The ring-of-five (transistors T22–T26) remains with transistors T22 and T24–T26 conducting and transistor T23 non-conducting or blocked until the next increase in potential of conductor 644 at which time the transistor T24 will become blocked and transistors T22, T23, T25 and T26 will conduct. The reconduction of the transistor T26 in response to the tenth input pulse on conductor 637 raises the potential of the up output terminal 603 to ground potential. This terminal 603 is connected by conductor 613 to the up input terminal 601a of the second decade counter D2. The decade counter D2 operates exactly like the decade counter D1. Therefore, each time an output pulse appears at the up output terminal 603 decade D2 will be actuated to count such pulses.

In order that the number of pulses applied to the decades D1–D5 may be observed, the output terminal of the decades D1–D5 are individually connected to the amplifiers and decoders A1–A5 respectively. These amplifiers and decoders are in turn individually connected to the readout devices R1–R5. Since each of the amplifiers and decoders A1–A5 are identical and each cooperates with its respective said decade D1–D5 in the same manner, a detailed showing of only one is presented. Likewise a detailed showing of only a single readout device R1 of the devices R1–R5 is shown for the same reason.

The amplifier and decoder A1 includes a power amplifying network for each of the output terminals 603, 604, 619, 620, 621, 624 and 625. These output terminals are individually connected to the bases of transistors T30, T32, T34, T36, T38, T40 and T42 respectively. The collectors of each of the transistors T30, T32, T34, T36 and T38 are connected to a potential bus 710 which preferably is maintained at 14 volts below ground potential. The emitters of each of the transistors T30, T32, T34, T36 and T38 are connected through individual resistor networks to bus 714 maintained at ground potential. Bus 712 is maintained at 2 volts above ground potential. Intermediate portions of these resistor networks are connected individually to the bases of power transistors T31, T33, T35, T37 and T39, respectively. The emitters of the power transistors T31, T33, T35, T37 and T39 are directly connected to bus 712 and their collectors are respectively connected to the amplifier and decoder output terminals 701, 702, 703, 704, 705. The transistors T40 and T42 each have their emitters connected to ground bus 714 and their collectors connected through resistors to the −30 volt bus 716 and their collectors connected individually to the base of the power transistors T41, T43 respectively. The collectors of these transistors T41 and T43 are connected to the −16 volt of bus 718 and their emitters are connected to output terminals 706 and 707 respectively.

The readout device R1 includes a pair of buses 750 and 751 which are connected to the terminals 706 and 707 of the amplifier and decoder A1. The bus 750 is connected to one filament terminal of each of the readout lamps bearing the indicia 0, 2, 4, 6 and 8, while the bus 751 is likewise connected to one of the filament terminals of the lamps bearing the odd numbered indicia, 1, 3, 5, 7 and 9. The other terminals of the lamps bearing the indicia 0–1; 2–3; 4–5; 6–7; and 8–9 are connected together in pairs and to the terminals 701–705 respectively. Rectifiers are individually connected in series with the lamps to prevent cross currents in the network. One or the other of the buses 750 and 751 will be energized depending upon which one of the transistors T20 and T21 is conducting. Initially transistor T21 will be conducting and T20 is non-conducting with the potential of the terminal 624 at substantially ground potential and with the terminal 625 below ground potential. Under these conditions the transistor T40 will be held blocked and the transistor T42 will be conducting. When transistor T42 conducts, it connects the base of the transistor T43 to the +2 volt bus thereby rendering the transistor T43 blocked. With the transistor T40 blocked, the potential of its collector will be substantially below ground potential and maintain the base of the transistor T41 at a substantially reduced potential to maintain the transistor T41 in a conducting condition. Since only the bus 750 is electrically connected to the potential bus 718, only the lamps bearing the indicia 0, 2, 4, 6 or 8 may be energized. The particular lamp which is lit will depend upon which one of the transistors T31, T33, T34, T37 and T39 are conducting.

At the zero count condition of the decades D1–D5, the transistor T22 will be non-conducting so that the output terminal 604 thereof is below ground potential. This terminal 604 is directly connected to the base of the transistor T30 and will cause this transistor to conduct and establish a voltage drop across the resistor network associated with the base of the transistor T31. This lowers the base potential sufficiently to render transistor T31 conducting. Current then flows from the bus 712 through the main electrodes of the transistor T31, the zero lamp, the bus 750, the main electrodes of the transistor T41 to the −16 volt bus 718 whereby the zero lamp is lit. The output terminals 603, 619, 620 and 621 will all be maintained substantially at ground potential. This holds the potential of the bases of the transistors T32, T34, T36 and T38 sufficiently elevated so that these transistors are maintained in a non-conducting condition. With these transistors blocked, the bases of the transistors T33, T35, T37 and T39 are at a potential high enough with respect to that of the emitter to maintain the transistors non-conducing and the lamps 2–9 will remain dark.

It will be appreciated that when the next pulse is supplied to the decade D1, the transistor T21 will become blocked and the transistor T20 will become conductive. The potential of the terminals 624 and 625 will reverse and the conducting conditions of the transistors T40 and T41 will reverse. Conduction of transistor T40 blocks the power transistor T41 to deenergize the bus 750. Blocking of the transistor T42 causes the power transistor T43 to conduct to energize the bus 751. Since the conductive condition of the ring-of-five (transistors T22–T26) did not change the transistor T31 remains conducting and the lamp with the indicia 1 becomes lit indicating that one pulse has been supplied to the decade counter D1.

When the next pulse is supplied to the decade counter D1, the potential of the terminal 604 will be increased to substantially ground potential and the potential of the terminal 619 will be reduced substantially below ground potential. This causes the transistor T30 to block and the transistor T32 to conduct, thereby blocking transistor T31 and unblocking transistor T33. This deenergizes the output terminal 701 and energizes output terminal 702 so that one or the other of the lamps bearing the numeral 2 or 3 may become illuminated. In this instance, it will be the lamp having the numeral 2 because, as will be understood, the second pulse supplied to the decade counter causes the transistor T21 to conduct and the transistor T20 to become non-conducting and return the potential condition of the terminals 624 and 625 and the conductive conditions of transistors T40–T42 to their initial conditions.

Upon the occurrence of the third pulse, the transistor T20 conducts, transistor T21 blocks reversing the energized condition of the terminals 624 and 625 and of the transistors T40–T42 so that the lamp having the numeral 3 is lit and lamp 2 is dark. Similarly upon the occurrence of the 4th, 5th, 6th, 7th, 8th, and 9th pulses, the lamps 4, 5, 6, 7, 8 and 9 will be lit in turn. When the tenth or zero pulse occurs, the decade counter D1, amplifier and decoder panel A1, and readout device R1 will return back to their original condition with the lamp bearing the numeral 0 illuminated. As explained the tenth pulse applied to the decade D1 will cause the transistor T26 thereof to reconduct and raise the potential of the output terminal 603. This increase in potential pulses the input terminal 601a of the decade D2.

An amplifier and decoder panel A2 is associated with the decade D2 and controls a readout device R2 all in the same manner as decade D1 actuated the panel A1 and panel A1 controlled the readout device R1. Similarly panels A3–R3, A4–R4, and A5–R5 are arranged to indicate the counts applied respectively to these decade counters D3–D5 connected in cascade with the decade counters D1 and D2.

The decade counters D1–D5 down-count in much the same manner as described in connection with the up-count operation. The difference between the two operations is that in down-count operations the transistors T28 and T30 conduct so that the effective operating signal is derived from the down-count input terminal 602 (not pertinent with respect to decade D1) and the stepping of the ring-of-five transistors T22–T26 occurs as a consequence of the reconduction of transistor T20 rather than transistor T21 which was used for up-count stepping. In down-count operation the transistors are stepped in the opposite directions so that the blocked transistor order is T22, T26, T25, T24, T23, T22, etc. This reversed stepping is accomplished by connecting the collectors of the transistors T22–T26 through individual resistors and capacitors to the bases of the transistors T26 and T22–T25 respectively, instead of to the bases of the transistors T23–T26 and T22 respectively. It will be apparent that under these conditions the capacitor which is elevated by the raising of the potential of the bus 645 is connected between the collector of transistor T22 and the base of the transistor T26 rather than between the collector of transistor T22 and the base of the transistor T23 as in the up-counting operation. The reason for utilizing the reconduction of the transistor T20 to provide the pulses for actuating the ring-of-five transistors is that the cascaded decade D2 needs to be actuated on an odd numbered pulse as for example, the first pulse after zero rather than on an even numbered pulse for example, the tenth pulse after zero.

As far as the decade D1 is concerned only a single input terminal is required because the pulses which are to be counted or subtracted are applied through the conductor 442. In the case of the decoder D2–D5, however, these decades are to be actuated in up-count operation from output terminal 603 and in down-count operation from output terminal 604 and these terminals 603 and 604 cannot be ohmically connected together so that separate terminals are required.

The sequence control switch or counter 70 is identical to the decade counter D1–D5. The terminals 501, 502, 503, 504, 506, 508, 510, 519–521, 524 and 525 of the counter 70 correspond to the terminals 601, 602, 603, 604, 606, 608, 610, 617–621, 624 and 625 of the decade counters D1–D5. The down-count function of the counter 70 is not used and consequently no connections are made to the down-count input terminal 502 or to the down count-control terminal 510. The up-count control terminal 508 is directly connected to a negative potential source as shown to maintain the up-count transistors T27 and T29 thereof continually conductive. As explained above in connection with the decade counter D1, the potential of the output terminals 524 and 525 will be opposite to one another and alternate between a potential which is substantially below and a potential which is substantially at ground potential.

The programmer P2 contains the bistable multivibrator 56 which controls the up and down counting of the decades D1–D5 by rendering solely the up-count controlling transistors T27 and T29 conducting or the down-count controlling transistors T28 and T30 conducting. The programmer P2 also contains the monostable multivibrator 56 which interrupts the timing interval and the supply of pulses to the decades during the reversing action which occurs during a down-count interval in which the peripheral speed of the second roll is greater than that of the first roll.

The multivibrator 56 comprises a pair of transistors T50 and T51 having their emitters connected to a ground potential bus 800 and their collectors connected through individual resistors to a potential bus 801 maintained at 30 volts below ground. The base of the transistor T50 is connected to an intermediate point of a voltage divider connected between the collector of transistor T51 and a potential bus 802 which is maintained at 30 volts above ground. Similarly the base of the transistor T51 is connected to an intermediate point of a voltage divider connected between the collector of transistor T50 and the bus 802. With this arrangement one or the other of the transistors T50 and T51 will be conducting and the other non-conducting.

The multivibrator 56 is tripped or actuated to its two conditions by applying a blocking potential to the base of the conducting one of the transistors T50 and T51. The blocking of the conducting transistors lowers the potential of its collector and acts through the voltage divider connected thereto to reduce the potential of the base of the blocked transistor so that this latter transistor becomes conductive. When this occurs its collector potential raises and acts through the voltage divider connected thereto to place a blocking potential on the base of the formerly conducting transistor to maintain it blocked.

The multivibrator 56 is controlled by the counter 70 and by the monostable multivibrator 60. The base of the transistor T50 is connected to the output terminal 525 of counter 70 through a rectifier 803, a capacitor 804 and a conductor 468. When the terminal 525 is pulsed from a below ground to substantially ground potential, the potential at both terminals of the capacitor 804 is momentarily raised. The increase in potential of the capacitor 804 is immediately applied to the base of transistor T50 through the rectifier 803 and causes transistor T50 to block. Shortly thereafter the capacitor 804 will discharge through the resistor 805 to ground but since only a momentary blocking of the transistor T50 is necessary to flip the multivibrator 56, the subsequent reduction in capacitor charge is without effect on the multivibrator 56.

The base of the transistor T51 is similarly connected to the conductor 469 and therethrough to the output terminal 524 of the counter 70. In instances when the peripheral speed of the second roll to be counted is greater than that of the first roll, a reversal of this multivibrator to cause the decades to count-up is required. Since, under these conditions, the counter 70 will not be effective to supply the flipping signal the base of the transistor T51 is connected through a network comprising a rectifier and a capacitor in series connection to a conductor 806. The potential of the conductor 806 is controlled by the monostable multivibrator 60 of the programmer P2.

This monostable multivibrator 60 comprises the transistors T52 and T53. The emitters of these transistors are connected to the ground bus 800 and the collectors thereof are connected through individual resistors to the negative potential bus 801. The base of the normally blocked transistor T53 is connected to an intermediate point in a voltage divider connected between the collector of the transistor T52 and the positive bus 802. It will be apparent that when T52 conducts to maintain its collector substantially at ground potential, the divider will maintain the base of the transistor T53 at a sufficiently elevated potential to maintain transistor T53 non-conducting. The base of the transistor T52 is connected to an intermediate portion 807 of a voltage divider connected between the buses 801 and 802. The divider is so proportioned that the portion 807 is normally at a potential to maintain transistor T52 conducting. This is the stable state of the multivibrator 60.

In order to control the operation of the multivibrator 60, the base of the transistor T53 is connected through a rectifier 808 series connected with a capacitor 809 to the control conductor 658 which is connected to the output terminal 603d of the decade D5. It should be noticed that rectifier 808 is reversedly arranged as compared with the rectifier 803 and the multivibrator 60 unlike the multivibrator 56 is actuated by rendering the blocked one of the transistors conducting rather than rendering the conducting one of the transistors blocked. When the decade counter D5 is actuated downwardly from a zero count (0000.0 to 9999.9), its output terminal 603d becomes negative. This acts through the capacitor 809 to momentarily lower the potential of the base of the transistor T53 to cause this transistor to conduct. When transistor T53 conducts, the potential of its collector is raised substantially to ground potential thereby raising the potential of both plates of a capacitor 810 connected between the collector of transistor T53 and the voltage divider intermediate portion 807. This momentarily raises the potential of the base of the transistor T52 to render it non-conducting. With the transistor T52 non-conducting the voltage divider associated with the base of the transistor T53 is connected not between ground potential source and the bus 802 but between a below ground potential source and the bus 802 to bias the base for conduction of the transistor T53. The transistor T53 will remain conducting as long as the transistor T52 remains blocked. The blocked period of the transistor T52 is determined by the time interval required for the capacitor 810 to discharge sufficiently to permit the potential of the base of transistor T52 to lower enough to permit transistor T52 to reconduct. When this occurs transistor T53 blocks and the monostable multivibrator is in its stable condition.

The programmer P3 is controlled by the multivibrator 66 and actuates a readout device R6 to indicate that the decades D1–D5 are up-counting to indicate the excess peripheral speed of the second roll over that of the first roll. The programmer P3 comprises the multivibrator 66 and an impedance matching portion 902. The multivibrator 66 is bistable and is similar to the multivibrator 56. It comprises a pair of transistors T61 and T62. The base of the transistor T62 is connected through a rectifier 560 to the reset bus 526 which is momentarily raised above ground potential prior to an operation of the measuring apparatus. Therefore, at the start of a measuring cycle, the transistor T62 will be non-conducting and the transistor T61 will be conducting.

The bases of the relay transistors T63 and T64 are individually connected through current limiting resistors to the collectors of the transistors T61 and T62 respectively. The collectors of the transistors T63 and T64 are connected to a negative potential bus 906 which is maintained at minus fourteen volts with respect to ground and the emitters are connected through individual voltage dividers 908 and 909 respectively to the grounded potential bus 910. With this arrangement, the transistors T63 and T64 conduct when the one of the transistors T61 and T62 with which they are individually associated are blocked and conversely.

The readout device R6 comprises a pair of lamps 950 and 952 bearing the indicia — and + respectively and a pair of power transistors T65 and T66. The emitters of the transistors T65 and T66 are connected to a potential bus 954 which is maintained at negative two volts. The collectors of these transistors are individually connected to a —8.3 volt potential supply bus 956 through the lamps 950 and 952 respectively. The bases of these transistors are individually connected to intermediate points 911 and 912 of the voltage dividers 908 and 909. With the transistor T63 conducting the point 911 will be at a sufficiently low potential to cause the transistor T65 to conduct and conversely. Similarly, the transistor T66 is controlled by the transistor T64. The lamps 950 and 952 will, of course, be lit or dark depending upon the condition of the transistors T65 and T66, respectively. Since the transistor T62 is blocked at the start of a measuring operation, the transistors T64 and T66 will be held conducting and the lamp 952 will be lit. When, in the case of a down-count operation, the down pulses exceed the prior number of up-counts, the multivibrator 66 is actuated by the programmer P2 to cause the transistor T61 to block and the transistor T62 to conduct. This, in turn, blocks the transistors T64 and T66 causing the lamp 952 to darken and unblock the transistors T63 and T65 causing the lamp 950 to become lit.

It is believed that the remainder of the circuit details may best be described by a description of the operations of the measuring apparatus. At the start of a measuring operation, the counter 70 is in its initial condition with its output terminals 503, 524, 519–521 at ground potential and terminals 504 and 525 are substantially below ground potential, pulses supplied by the pickup device 42c will commence to flow to the decade counter D1 upon opening of the AND-gate 62. The UP-gate 48, OR-gate 406, and NOT-gate 408 will already be open. At the instant that the timing device TD reaches its initial or zero-count condition, the potential of all of the barred conductors A–P will rise substantially to ground potential and the potential of all of the unbarred conductors A–P will fall from substantially ground potential to a potential substantially below ground. The reduction in potential of the bus P reduces the potential of the conductor 481 and of the base of the now blocked transistor T17b which immediately conducts to block the transistor T18b. When transistor T18b blocks the potential of the output terminal 445 falls thereby rendering the transistor T15 conductive to open the AND-gate for flow of pulses from the device 42c to the decade counters D1– D5. At this time the transistor T16 will also be conductive because its base is connected to the output terminal 504, of the counter 70 which is at a potential substantially below ground potential.

Pulses will continue to be supplied by the device 42c to actuate the decade counters D1–D5 until such time that all of the buses A–A to P–P connected to the matrix output bus 214 are negative. The switches are assumed to have been adjusted as described above so that this occurs at a time interval when the number of pulses which have been counted by the decade counters D1–D5 is exactly ten times the peripheral speed in feet per minute of the roll associated with the pickup device 42c. When all of the buses A–A to P–P which are connected to the matrix output bus 214 are negative, the transistor T19 will conduct causing the potential of terminal 462 to fall. The charging current through condenser 460 renders transistor T18 conducting which raises the potential of the output terminal 466 and bus 426 to close the UP-gate 48 by rendering the transistor T11 thereof non-conducting. The rendering of the transistor T18 conducting also blocked the transistor T17 in the manner described above in the description of the multivibrator 46 to maintain the multivibrator in this operating condition.

The timer TD continues to time out its full cycle and eventually all of the buses M, N, O and P are all negative. When this occurs the potential of the conductor 480 will be reduced substantially below ground potential and transistor T19b of the multivibrator 68 will conduct to render transistor T18b conducting and transistor T17b blocked. The conduction of transistor T18b raises the potential of the output terminal 445 and the base of the transistor T15 to render transistor T15 blocked to open the AND-gate 62.

The increase in potential of the terminal 445 is also applied to the input terminal 501 of the counter 70 to actuate the multivibrator portion thereof (corresponding to 612 of D1) to cause the potential of the output terminal 525 to rise substantially to ground potential and the potential of the output terminal 524 to decrease to a value substantially below ground potential. The output terminal 524 is connected by conductor 469 to the transistor T17a and when the potential thereof decreases transistor T17a conducts to block transistor T18a. The blocking of the transistor T18a causes the output terminal 472 of the multivibrator 52 to lower. This terminal 472 is connected to the base of the transistor T11a by conductor 428 and renders it conductive. The opening of the DOWN-gate 54 is without immediate effect since the AND-gate 62 is closed at this time.

The decrease in potential of the terminal 524 is applied through the conductor 469 and coupling capacitor to the base of the transistor T51 which thereupon conducts to raise the potential of the output terminal 646 and to block the transistor T50. Terminal 646 is connected by conductor 647 to the up-count control terminals 608, 608a, 608b, 608c and 608d of the decade counters D1–D5 and, as described, renders the up-count control transistors T27 and T29 thereof non-conductive when the terminal 646 is at its elevated potential. The output terminal 649 is connected by conductor 659 to the down-count control terminals 610, 610a, 610b, 610c and 610d of the decade counters D1–D5. This reduction in potential of the terminal 649 when applied to the decade terminal 610 renders the down-count transistors T28 and T30 conductive thus orienting the counter to count down or subtract.

At the end of the timing cycle of the timing device TD all of the input buses A–P will be substantially below ground potential and all of the buses A–P will be substantially at ground potential. At the next cycle of the oscillator 72 the timer TD resets and the bus P goes negative. When bus P goes negative it renders transistors T17b conducting to block the transistor T18b thereby lowering the potential of the output terminal 445 of the multivibrator 68. This, as explained above, renders transistor T15 conducting to open the AND-gate 62. Pulses are now supplied from the pickup device 42*d* through the gates 54, 406, 408 and 62 to the decade counters D1–D5. Since the decade counters D1–D5 are set for down-counting these pulses are subtracted from the up pulses.

As explained above the switch SW2B connects the conductor 228 to a desired one of the output buses of the matrix 200. This may be but usually will not be the same output bus to which the conductor 226 is connected. In this instance it is assumed that the roll associated with the device 42*d* is not the same diameter as the roll associated with the device 42*c* and the conductor 228 must therefore be connected to a different output conductor 216 which is connected to the buses A–A to P–P to provide the current timing as described above.

If the peripheral speed of the roll associated with the device 42*d* is less than that of the roll which is associated with the device 42*c*, the pulses from device 42*d* will be supplied to the decade counters D1–D5 in uninterrupted succession until the end of the time interval for which the matrix 200 is adjusted to reduce the potential of the output bus 216. At the end of this time interval, the DOWN-gate opens and further interrupting the supply of pulses to the decades D1–D5. The reading then shown on the readout devices R1–R5 is the difference in peripheral speed in feet per minute that the first roll to be measured exceeds the second roll to be measured.

If the peripheral speed of the second roll is greater than that of the first roll, the decade counters D1–D5 would in accordance with the above description down-count through 0000.0 to 9999.9 or below and the difference in peripheral speed would be determined by subtracting the indicated reading from 10,000. This in many instances is undesirable and to prevent such from occurring the counters are reversed in the manner to be described so that the further pulses from the second measurement will again cause the counter to count upwardly. Therefore at the count of 9999.9, both the timer and flow of pulses from the active one of the devices 42*a*–42*h* are interrupted until the counters are reset. At the count of 9999.9 the output terminal 603*d* of the decade D5 suddenly becomes strongly negative. This negative signal is applied via the conductor 658 to the monostable multivibrator 60 to render the transistor T53 conducting and the transistor T52 non-conducting. The rendering of the transistor T52 non-conducting lowers the potential of the output terminal 449 and of the conductor 82. This renders the transistor T13 conducting and closes the NOT-gate 408 to prevent further pulse flow to the decade counters D1–D5. The conductor 82 is also connected to the gate 64 which closes to interrupt simultaneously the interval timing operation of the device TD and the flow of pulses to the decade counters D1–D5 to provide a switching interval to permit the reversing of the decade counters D1–D5 and of the readout device R6.

The conduction of the transistor T53 increases the potential of the output terminal 817. This increase in potential is applied through the coupling capacitor 818 and rectifier 819 and conductor 820 to the base of the transistor T61 which is thereby rendered non-conducting. This reverses the condition of the multivibrator 66 and the transistor T62 conducts to block the transistors T64 and T66 to extinguish the plus lamp 952. Blocking of the transistor T61 renders the transistors T63 and T65 conducting to light the negative lamp 950. The decade counter reset conductor 526 is connected through a rectifier 821 and the capacitor 818 to the output terminal 817 and the increase in potential of this terminal acts to reset the decade counters D1–D5 to their initial or "count-start" condition to again cause the readout devices to read 0000.0. Additionally the output terminal 817 is connected via conductor 806 to the multivibrator 56. The increase in potential of the terminal 817 renders the transistor T51 blocked and the transistor T50 conducting. This reverses the potential of the conductors 647 and 659 whereby the decade counters D1–D5 are again energized to count upwardly.

At the end of the predetermined time interval the monostable multivibrator 60 returns to its stable condition with transistor T52 conducting and transistor T53 blocked. The blocking of the transistor T53 reduces the potential of the output terminal without effect. The raising of the potential of the output terminal 449 raises the potential of conductor 82 to block the transistors T5 and T13. Blocking of transistor T5 opens the timing device gate 64 to reinitiate the timing out of the timing interval. Blocking of transistor T13 opens the NOT-gate 408 to reinitiate the flow of pulses to the decade counters D1–D5. The blocking of the transistor T13 also caused the potential of the bus 438 to go negative and cause the transistor T14 to become conductive. Since, at this time, the transistor T15 and T16 are also conductive, the transistors T14, T15, and T16 will conduct and raise the potential of the output terminal 437 substantially to ground potential. This supplies an actuating pulse to the decade counters D1–D5 causing the readouts R1–R5 to read 0000.1 and replaces the pulse which was required to change the readout reading from 0000.0 to 9999.9.

At the end of the timing interval, as determined by the timing device TD, the potential of the conductor 228 will be lowered substantially and the multivibrator 52 will be actuated to cause transistor T18*a* to conduct and transistor T17*a* to block. Conduction of transistor T18*a* raises the potential of its output terminal to render transistor T11*a* blocked whereby the gate 54 is closed to terminate the flow of pulses to the decade counters D1–D5. The readout devices will now read the feet per minute peripheral speed differences between the rolls. The minus sign on the readout device R6 indicates that the peripheral speed of the second roll is greater than that of the first roll.

At the end of the predetermined time interval the potential of the buses M, N, O and P will all become negative whereby the potential of the conductor 480 becomes negative to cause transistor T19*b* to conduct. As explained before this causes the multivibrator 68 to flip and close the gate 62 to prevent further flow of pulses therethrough when the gate 48 reopens. The flipping of the multivibrator 68 also pulses the counter 70. This pulse flips the multivibrator in counter 70 to reverse the potentials of the output terminals 524 and 525 to open the UP-gate 48 and close the DOWN-gate 54 without effect due to the closed condition of gate 62. The flipping of the multivibrator of counter 70 also caused the potential of the output terminal 504 to increase substantially to ground potential and that of the output terminal 519 to go substantially below ground potential. The increase in potential of the terminal 504 is transmitted via conductor 446 to the transistor T16 which thereupon blocks to maintain the gate 62 open even though the transistor T15 is subsequently made conductive. The decrease in potential of output terminal 519 is without effect at the illustrated setting of the switch SW3.

The timing device TD continues to time out its timing interval to actuate the multivibrators 46, 52 and 68 in the manner substantially as described above but without any pulses being supplied to the decades D1–D5 due to the non-conductivity of transistor T16. At the time the buses M, N, O, P are rendered negative (61,440 cycles after the start of the last named timing interval), the transistor T19*b* is rendered conducting and the transistor T18*b* therefore becomes conducting to raise the potential of the output terminal 445. This again pulses the counter 70. Since two pulses are required to change the relative potential of the output terminals 503, 504, and 519–521 the only effect is to reverse the potential of the output terminals 524 and 525. This is without any operational effect on the measuring apparatus other than to change the open conditions of the gates 48 and 54.

The timing device TD continues to time and at the next time all of the buses M, N, O, and P are negative at once the transistor T18b will again become conducting to raise the potential of the terminal 445 and actuate the counter 70. This time, however, the potential of the output terminal 519 is raised to substantially ground potential and the potential of the output terminal 520 is reduced to a potential substantially below ground potential. This lowers the potential of the terminal 550 of a capacitor 552. The other terminal 554 of capacitor 552 is connected through a current limiting resistor 556 to ground and the capacitor will be charged with terminal 554 positive with respect to terminal 550.

The timing device TD again continues to time and actuate the multivibrator until the next time all of the buses M, N, O, and P are negative at once to flip the multivibrator 68 to actuate the counter 70. This actuation of the counter is without effect since, as stated before, two pulses are required to change the relative potential of the output terminals 503, 504, and 519–521. Upon the next actuation of the counter 70, as described, the potential of the output terminal 520, and the terminal 550 of the capacitor 552 which is connected thereto, will be elevated to substantially ground potential. This action momentarily elevates the potential of the capacitor terminal 554 and sends a positive potential pulse through the rectifier 558 to energize the reset bus 526 to reset the decades D1–D5 and therethrough the readout devices R1–R5. A positive pulse is also sent through rectifier 560 to block the transistor T62 and render the transistor T61 conducting whereby the negative lamp 950 is deenergized and the positive lamp 952 is energized thus resetting the readout device R6. A positive pulse is also transmitted through a rectifier 562 to the reset terminal 506 of counter 70 to reset this counter in the same manner that the decade counters were reset. At the start of the next timing cycle of the timing device TD a subsequent operation as above described will be repeated for the devices which are connected to the apparatus through the switches SW1 and SW2.

There has been shown and specifically described herein a presently preferred embodiment of the invention. Since the details shown and described herein may be changed considerably and still come within the scope of this invention, this embodiment is to be taken as illustrative rather than limitative and the scope of the invention is to be determined by the hereinafter appended claims.

What is claimed and is desired to be secured by United States Letters Patent is as follows:

1. In an apparatus for measuring the difference in the speed of two movements, a first pulse producing means providing a pulse for each predetermined increment of movement of a first of said movements, a second pulse producing means providing a pulse for each predetermined increment of movement of a second of said movements, pulse counting means, means for supplying said pulses to said counting means, and means for timing the durations during which said counting means is responsive to said pulses, said timing means acting to time the period during which said first pulse producing means is effective to actuate said counter as a direct function of the magnitude of said predetermined increment of said first movement and to time the period during which said second pulse producing means is effective to actuate said counter as a direct function of the magnitude of said predetermined increment of said second movement, said counting means including means for determining the numerical difference of the pulses supplied by said first and second pulse producing means.

2. In an apparatus for measuring the difference in speed of two movements, a first pulse producing means providing a pulse for each predetermined increment of movement of a first of said movements, a second pulse producing means providing a pulse for each predetermined increment of movement of the second of said movements, a reversible pulse counting device for counting in two directions, means connecting each of said pulse producing means to said counting device, said counting device being operable to count initially in a first of said two directions when receiving pulses from said first pulse producing means and initially in the second of said two directions when receiving pulses from said second pulse producing means, and timing means for controlling the time interval that each of said pulse producing means is effective to actuate said counting device, said timing means being effective to determine first and second intervals during which said counting device is actuated by said first and said second pulse producing means respectively, said timing means acting to time the period during which said first pulse producing means is effective to actuate said counter as a direct function of the magnitude of said predetermined increment of said first movement and to time the period during which said second pulse producing means is effective to actuate said counter as a direct function of the magnitude of said predetermined increment of said second movement.

3. In an apparatus for measuring the difference in speed of two movements, a first pulse producing means providing a pulse for each predetermined increment of movement of a first of said movements, a second pulse producing means providing a pulse for each predetermined increment of movement of the second of said movements, a reversible pulse counting device for counting in two directions, means connecting each of said pulse producing means to said counting device, said counting device being operable to count initially in a first of said two directions when receiving pulses from said first pulse producing means and initially in the second of said two directions when receiving pulses from said second pulse producing means, timing means for controlling the time interval that each of said pulse producing means is effective to actuate said counting device, said timing means being effective to determine first and second intervals during which said counting device is actuated by said first and said second pulse producing means respectively, said timing means acting to time the period during which said first pulse producing means is effective to actuate said counter as a direct function of the magnitude of said predetermined increment of said first movement and to time the period during which said second pulse producing means is effective to actuate said counter as a direct function of the magnitude of said predetermined increment of said second movement, and means resetting said counter prior to the initiation of the timing of said intervals.

4. In an apparatus for measuring the difference in speed of two movements, a first pulse producing means providing a pulse for each predetermined increment of movement of a first of said movements, a second pulse producing means providing a pulse for each predetermined increment of movement of the second of said movements, a reversible pulse counting device for counting in first and second directions, means connecting said pulse producing means to said counting device whereby said counting device is actuated to count said pulses, said connecting means including timing means to control first and second time intervals that said pulses are effective to actuate said counting devices respectively, said connecting means being operable to cause said counting device to count initially in said first direction when receiving pulses from said first pulse producing means and initially in said second direction when receiving pulses from said second pulse producing means, said timing means being effective to render said first pulse producing means effective to actuate said counting device for said first time interval and to render said second pulse producing means effective to actuate said counting device for said second time interval as a consequence of the ratio of the pulses supplied to said counter by said first and second pulse producing means reaching a predetermined magnitude to reverse said counting direction of said counting device whereby said counting device counts in said first direction as long as said predetermined magnitude is exceeded.

5. In an apparatus for measuring the difference in speed of two movements, a first pulse producing means providing a pulse for each predetermined increment of movement of a first of said movements, a second pulse producing means providing a pulse for each predetermined increment of movement of the second of said movements, a reversible pulse counting device for counting in first and second directions, means connecting said pulse producing means to said counting device whereby said counting device is actuated to count said pulses, said connecting means including timing means to control first and second time intervals that said pulses are effective to actuate said counting device, said counting device being operable to count initially in said first direction when receiving pulses from said first pulse producing means and initially in said second direction when receiving pulses from said second pulse producing means, said timing means being effective to render said first pulse producing means effective to actuate said counting device for said first interval and to subsequently render said second pulse producing means effective to actuate said counting device for said second interval, said timing means being effective to determine said first interval as a direct function of the magnitude of said predetermined increment of said first movement and to determine said second interval as a direct function of the magnitude of said predetermined increment of said second movement, and means actuated as a consequence of said pulses being supplied to said counting device from said second pulse producing means exceeding the number of said pulses being supplied to said counting device from said first pulse producing means to reverse said counting direction of said counting device whereby said counting device counts in said first direction for the balance of said second time interval.

6. In an apparatus for indicating the difference in speed of two moving bodies, a first pulse producing means providing pulses at a frequency which is proportional to the speed of the first of said bodies, a second pulse producing means providing pulses at a frequency which is proportional to the speed of the other of said bodies, a counter for counting pulses, a programming apparatus including a plurality of gates, each said gate having an open condition in which pulses may be transmitted therethrough and a closed condition in which pulses are prevented from passing therethrough, means including a first and a second of said gates in series connection connecting said first pulse producing means to said counter, means including a third of said gates and said second gate in series connection connecting said second pulse producing means to said counter, said second gate being intermediate each of said first and said third gates and said counter, timing means controlling the time interval that said first and third gates are maintained in their said open condition, switch means connected between said timing means and said first and third gates for selectively placing said gates under control of said timing means, a sequencing device connected to actuate said switch means to open solely one of said gates at any one time, and means actuated by said timing means for actuating said sequencing device.

7. In an apparatus for indicating the difference in speed of two moving bodies, a first pulse producing means providing pulses at a frequency which is proportional to the speed of the first of said bodies, a second pulse producing means providing pulses at a frequency which is proportional to the speed of the other of said bodies, a counter for counting pulses, a programming apparatus including a plurality of gates, each said gate having an open condition in which pulses may be transmitted therethrough and a closed condition in which pulses are prevented from passing therethrough, means including a first and a second of said gates in series connection connecting said first pulse producing means to said counter, means including a third of said gates and said second gate in series connection connecting said second pulse producing means to said counter, said second gate being intermediate each of said first and said third gates and said counter, timing means controlling the time interval that said first and third gates are maintained in their said open condition, switch means connected between said timing means and said first and third gates for selectively placing said gates under control of said timing means, a sequencing device connected to open solely one of said first and third gates at any one time, means actuated by said timing means for actuating said sequencing device, and means connecting said sequencing device to said counter, said sequencing device being effective to reverse the direction of operation of said counter prior to the actuation of switch means to connect said third gate to said timing device.

8. In an apparatus for indicating the difference in speed of two bodies, a first pulse producing means supplying pulses at a frequency proportional to the speed of the first of said two bodies, a second pulse producing means supplying pulses at a frequency proportional to the speed of the second of said two bodies, a reversible counter, means including a cycling timing device having a fixed time cycle and a sequencing network, said last-named means determining a first and a second and a third fractional portion of a complete cycle, a plurality of gates, each said gate having an open condition in which pulses may pass therethrough and a closed condition in which pulses are prevented from flowing therethrough, a plurality of switching devices, means connecting said first pulse producing means to said counter and including a first and a second of said gates, means connecting said second pulse producing means to said counter and including a third of said gates and said second gate, said second gate being in series with each of said first and third gates and positioned intermediate said counter and said first and third gates, means operatively connecting said first gate to said timing device and including a first of said switching devices whereby said first gate is held in its said open condition during said first fractional portion of said time cycle, means operatively connecting said third gate to said timing device and including a second of said switching devices whereby said third gate is held in its said open condition during said second fractional portion of said time cycle, said sequencing network being connected to said first and said second switching devices and operative to actuate said first and second switching devices into a condition in which they open the said gates with which they are associated, a third of said switching devices being connected to and actuatable by said timing device to hold said third gate closed during at least a portion of said third fractional portion of said cycle and to open said third gate at the start of said complete cycle, said third switching device being connected to said sequencing network and effective to actuate said sequencing network, said sequencing network being effective upon successive actuations to alternately open said first and third gates, said sequencing network being connected to said counter and operable to render said counter in condition to count in one direction when said first gate is open and to count in a direction opposite to said one direction when said third gate is open.

9. In an apparatus for indicating the difference in speed of two bodies, a first pulse producing means supplying pulses at a frequency proportional to the speed of the first of said two bodies, a second pulse producing means supplying pulses at a frequency proportional to the speed of the second of said two bodies, a reversible counter, means including a cycling timing device having a fixed time cycle and a sequencing network, said last-named means determining a first and a second and third fractional portion of a complete cycle, a plurality of gates, each said gate having an open condition in which pulses may pass therethrough and a closed condition in which pulses are prevented from flowing therethrough, a plurality of switching devices, means connecting said first pulse producing means to said counter and including a first and a second of said gates, means connecting said second pulse producing means to said counter and including a third of said gates and said second gate, said second gate being in series with each of said first and third gates and positioned intermediate said counter and said first and third gates, means operatively connecting said first gate to said timing device and including a first of said switching devices whereby said first gate is held in its said open condition during said first fractional portion of said time cycle, means operatively connecting said third gate to said timing device and including a second of said switching devices whereby said third gate is held in its said open condition during said second fractional portion of said time cycle, said sequencing network being connected to said first and said second switching devices and operative to actuate said first and second switching devices into a condition in which they open the said gates with which they are associated, a third of said switching devices being connected to and actuatable by said timing device to hold said third gate closed during at least a portion of said third fractional portion of said cycle and to open said third gate at the start of said complete cycle, said third switching device being connected to said sequencing network and effective to actuate said sequencing network, said sequencing network being effective upon successive actuations to open alternately said first and third gates, said sequencing network being connected to said counter and operable to render said counter in condition to count in one direction when said first gate is open, said sequencing network being effective to actuate said counter for operation in a direction opposite to said one direction subsequent to closure of said first gate and prior to opening of said third gate, and timing means actuated in response to the passage of a number of pulses through said third gate which is in excess of the number of pulses passed through said first gate for interrupting the operation of said timing device and for closing said third gate and for thereafter reinitiating the operation of said cycling device and for opening said third gate, said pause timing means being operable to render said counter in condition to count in said one direction.

10. In an apparatus for indicating the difference in speed of two bodies, a first pulse producing means supplying pulses at a frequency proportional to the speed of the first of said two bodies, a second pulse producing means supplying pulses at a frequency proportional to the speed of the second of said two bodies, a reversible counter, means including a cycling timing device having a fixed time cycle and a sequencing network, said last-named means determining a first and a second and third fractional portion of a complete cycle, a plurality of gates, each said gate having an open condition in which pulses may pass therethrough and a closed condition in which pulses are prevented from flowing therethrough, a plurality of switching devices, means connecting said first pulse producing means to said counter and including a first and a second of said gates, means connecting said second pulse producing means to said counter and including a third of said gates and said second gate, said second gate being in series with each of said first and third gates and positioned intermediate said counter and said first and third gates, means operatively connecting said first gate to said timing device and including a first of said switching devices whereby said first gate is held in its said open condition during said first fractional portion of said time cycle, means operatively connecting said third gate to said timing device and including a second of said switching devices whereby said third gate is held in its said open condition during said second fractional portion of said time cycle, said sequencing network being connected to said first and said second switching devices and operative to actuate said first and second switching devices into a condition in which they open the said gates with which they are associated, a third of said switching devices being connected to and actuatable by said timing device to hold said third gate closed during at least a portion of said third fractional portion of said cycle and to open said third gate at the start of said complete cycle, said third switching device being connected to said sequencing network and effective to actuate said sequencing network, said sequencing network being effective upon successive actuations to open alternately said first and third gates, said sequencing network being connected to said counter and operable to render said counter in condition to count in one direction when said first gate is open, said sequencing network being effective to actuate said counter for operation in a direction opposite to said one direction subsequent to closure of said first gate and prior to opening of said third gate, timing means actuated in response to the passage of a number of pulses through said third gate which is in excess of the number of pulses passed through said first gate for interrupting the operation of said cycling timing device and for closing said third gate and for thereafter reinitiating the operation of said cycling timing device and for opening said third gate, said pause timing means being operable to render said counter in condition to count in said one direction, and signal means for indicating the actuation of said counter by said pause timing means.

11. In an apparatus for indicating the difference in speed of two bodies, a first pulse producing means supplying pulses at a frequency proportional to the speed of the first of said two bodies, a second pulse producing means supplying pulses at a frequency proportional to the speed of the second of said two bodies, a reversible counter, a cycling timing device having a fixed time cycle and means for determining a first and a second and third fractional portion of said complete cycle, a plurality of gates, each said gate having an open condition in which pulses may pass therethrough and a closed condition in which pulses are prevented from flowing therethrough, a plurality of switching devices, each said switching device having first and second conditions, means connecting first first pulse producing means to said counter and including a first and a second of said gates, means connecting said second pulse producing means to said counter and including a third of said gates and said second gate, said second gate being in series with each of said first and third gates and positioned intermediate said counter and said first and third gates, means operatively connecting said first gate to said timing device and including a first of said switching devices whereby said first gate is actuated to its said open condition during said first fractional portion of said time cycle during periods in which said first switching device is in its said first condition, means operatively connecting said third gate to said timing device and including a second of said switching devices whereby said third gate is actuated to its said open condition during said second fractional portion of said time cycle during periods in which said second switching device is in its said first condition, a sequencing network connected to said first and said second switching devices and operative to actuate said first and second switching devices into their said first and second conditions, a third of said switching devices being connected to and actuatable by said timing device to its said first condition at said third fractional portion of said cycle and to its said second condition at the end of said complete cycle, said third switching device being connected to said second gate and to said sequencing network and effective in its said first condition to open said second gate and in its said second condition to actuate said sequencing network, said sequencing network being effective upon successive actuations to open said first gate by a first one of said successive actuations and to open said third gate by a subsequent one of said successive actuations, said sequencing network being connected to said counter and operable to render said counter in condition to count in one direction when said first gate is open, said sequencing network being effective to actuate said counter for operation in a direction opposite to said one direction subsequent to closure of said first gate and prior to opening of said third gate, pause timing means actuated in response to the passage of a number of pulses through said third gate which is in excess of the number of pulses passed through said first gate for interrupting the operation of said cycling timing device and for opening said third gate and for thereafter reinitiating the operation of said cycling timing device and for closing said third gate, said pause timing means being effective to render said counter effective to count in said one direction, and signal means actuated by said pause timing means to indicate an operation of said counter in said one direction.

12. In a measuring apparatus, a pair of pulse producing means, each said means producing pulses in response to movement of a material, a reversible pulse counting device, means for effectively connecting and thereafter effectively disconnecting one of said pulse producing means to said device whereby said device will count the number of said pulses occurring during a first time period that said one pulse producing means is effectively connected to said device, said connecting means thereafter being operable to effectively connect and to effectively disconnect another of said pulse producing means to said device whereby said device will count the number of said pulses occurring during a second time period that said other pulse producing device is effectively connected to said device, timing means for controlling the length of each of said time periods, and means for reversing the direction of counting of said counting device intermediate said first and second time periods.

13. In a measuring apparatus, a pair of pulse producing means, each said means producing pulses in response to movement of a material, a reversible pulse counting device, means for connecting and thereafter disconnecting one of said pulse producing means to said device whereby said device will count the number of said pulses occurring during a first time period that said one pulse producing means is connected to said device, said connecting means thereafter being operable to connect and to disconnect another of said pulse producing means to said device whereby said device will count the number of said pulses occurring during a second period that said other pulse producing device is coupled to said device, timing means connected to said connecting means for controlling the length of each of said periods, and means actuated in predetermined relation with said connecting means for actuating said counting device whereby said counting device initially counts in one direction when said connecting means is effective to connect said one pulse producing means to said counting device and is effective to initially count in the opposite direction when said connecting means is effective to connect said other pulse producing means to said counting device.

14. In an apparatus for indicating the difference in speed of two moving bodies, a first pulse producing means providing pulses at a frequency which is proportional to the speed of the first of said bodies, a second pulse producing means providing pulses at a frequency which is proportional to the speed of the other of said bodies, a counter for counting pulses, a plurality of gates, each said gate having an open condition in which pulses may be transmitted therethrough and a closed condition in which pulses are prevented from passing therethrough, means including a first of said gates connecting said first pulse producing means to said counter, means including a second of said gates connecting said second pulse producing means to said counter, timing means determining first and second time intervals, means including a first switch means connecting said timing means to said first gate whereby said first gate is held in its said open condition for said first interval, means including a second switch means connecting said timing means to said second gate whereby said second gate is held in its said open condition for said first interval, and a sequencing device connected to actuate said first switch means to permit said timing means to open said first gate solely for said first interval and thereafter to actuate said second switch means to permit said timing means to open said second gate solely for said second interval.

15. In combination, a pulse counter having first and second operating conditions and an output connection changeable in energization as a consequence of said counter reaching a predetermined count, gate means associated with said counter and having an open operating condition in which pulses may be supplied to said counter and a closed operating condition in which pulses are prevented from being supplied to said counter, a timer, means interconnecting said timer and said gate means for timing a predetermined fixed time period during which said gate means is maintained in its said open condition, a control device connected to said counter output connection and actuated as a consequence of said change in energization of said connection, means connecting said control device to said counter and to said timer, said control device being operable upon actuation to interrupt the timing out of said period by said timer and to change the operating condition of said counter from said first to said second operating condition, and means for subsequently rendering said timer effective to continue with the timing out of said period.

16. In combination, a reversible pulse counter having means for reversing its counting direction and an output connection actuated at a predetermined count of said counter, gate means associated with said counter and having an open condition in which pulses may be supplied to said counter and a closed condition in which pulses are prevented from being supplied to said counter, a timer interconnected with said gate means for maintaining said gate means in one of its said operating conditions for a fixed predetermined time interval, a control device connected to said output connections for actuation by said counter upon the attainment of said predetermined count, means connecting said control device with said gate means and said timer and said counter, said control device being operable upon actuation to interrupt the timing out of said interval by said timer and to actuate said gate means to its said closed position and to actuate said means for reversing the counting direction of said counter, and means subsequently rendering said control device ineffective to interrupt the timing out of said period by said timer whereby said timer is effective to continue with the timing out of said interval, said last-named means further being effective to actuate said gate means to its said open condition concurrently with the rendition of said timer effective to continue with the timing out of said interval.

17. In combination, a reversible pulse counter having means for reversing its counting direction and an output connection actuated at a predetermined count of said counter, gate means associated with said counter and having an open condition in which pulses may be supplied to said counter and a closed condition in which pulses are prevented from being supplied to said counter, a timer interconnected with said gate means for maintaining said gate means in its said open condition for a fixed predetermined time interval, a control device connected to said output connections for actuation by said counter upon the attainment of said predetermined count, means connecting said control device with said gate means and said timer and said counter, said control device being operable upon actuation to interrupt the timing out of said period by said timer and to actuate said gate means to its said closed position and to actuate said means for reversing the counting direction of said counter, means subsequently rendering said control device ineffective to interrupt the timing operation of said timer whereby said timer is effective to continue with the timing out of said interval, said last-named means further being effective to actuate said gate means to its said open condition concurrently with the rendition of said timer effective to continue with the timing out of said interval, and signal means actuated by said control device as a consequence of said control device being actuated by said counter.

18. In combination, a pulse counter operable in a first condition to additively totalize the number of pulses supplied thereto and in a second condition to subtractively totalize the number of pulses supplied thereto and including an output connection actuated at a predetermined totalization of said pulses, gate means associated with said counter and having an open condition in which pulses may be supplied to said counter and a closed condition in which pulses are prevented from being supplied to said counter, a first timer connected to said gate means for determining a fixed predetermined time period during which said gate means is in its said open condition, a second timer connected between said output connection and said gate means and said first timer and said counter, said second timer being operable to transfer said gate means from its said open position to its said closed position and maintain said gate means in its said closed position for a predetermined time interval and thereafter to return said gate means to its said open position, said second timer being operable to interrupt the timing out of said predetermined period by said first timer for said predetermined time interval and to reestablish the said timing out of said predetermined period at the end of said predetermined interval, said second timer being operable to reverse said condition of said counter during said predetermined interval.

19. In combination, a pulse counter operable in a first condition to additively totalize the number of pulses supplied thereto and in a second condition to subtractively totalize the number of pulses supplied thereto and including an output connection actuated as a consequence of the totalized number of said pulses decreasing a predetermined number of counts below a zero indication, gate means associated with said counter and having an open condition in which pulses may be supplied to said counter and a closed condition in which pulses are prevented from being supplied to said counter, actuating means including a timer connected to said output connection and to said gate means and to said counter, said timer being operable to transfer said gate means from its said open position to its said closed position and maintain said gate means in its said closed position for a predetermined time interval and thereafter to return said gate means to its said open position, said timer being operable to reverse said condition of said counter during said predetermined interval, means operated by said actuating means during said predetermined interval for resetting said counter to said zero indication and for supplying said predetermined number of actuating pulses to said counter.

20. In combination, a pulse counter resettable to a zero indication and operable in an adding direction to additively totalize the number of pulses supplied thereto and in a subtractive direction to subtractively totalize the number of pulses supplied thereto and including an output connection actuated as a consequence of the indication of said counter decreasing one count below said zero indication, gate means associated with said counter and having a pair of paths therethrough by which pulses may be supplied to said counter, said gate means having a first open condition in which pulses may be supplied to said counter through a first of said paths and a second open condition in which pulses may be supplied to said counter through a second of said paths and a closed condition in which pulses are prevented from being supplied to said counter through either of said paths, a first control network operatively associated with said gate means for controlling said open conditions, said control network including a first timer for determining the duration of said open conditions and a sequencer for determining the one of said paths which is rendered effective to supply pulses to said counter, means connecting said sequencer to said counter for actuation thereby, said sequencer being effective to render said adding direction effective during said duration of said first open condition of said first path and effective to render said subtracting direction effective during at least an initial portion of said duration of said second open condition of said second path, a second control network including a second timer connected to said output connection of said counter and operable as a consequence of the actuation of said output connection concurrently to place said gate means in its said closed position and to render said first timer ineffective to time said durations for a control time interval, said second control network being effective during said control time interval to reset said counter to said zero indication and to place said counter in its said adding direction, said second timer being effective at the expiration of said control time interval to place said gate means in its said second open condition and to render said first timer effective, and means actuated by said second control means as a consequence of the actuation thereof by said output connection and effective to supply a single pulse to actuate said counter in said adding direction.

21. In an apparatus for measuring the difference in speed of two movements, a reversible pulse counting device for counting in two directions, a first pulse producing means providing first predetermined number of pulses for each increment of movement of a first of said movements, means coupling said first pulse producing means to said counter whereby said counter counts said first pulses, a second pulse producing means providing second predetermined number of pulses for each increment of movement of the second of said movements, means coupling said second pulse producing means to said counter whereby said counter counts said second pulses, said counting device being operable to count initially in a first of said directions when receiving pulses from said first pulse producing means and initially in the second of said directions when receiving pulses from said second pulse producing means, and means for timing first and second intervals during which said counting device is actuated by said first and said second pulse producing means respectively, said timing means being effective to determine the length of said intervals such that the product of the magnitude of said first predetermined number of pulses and the magnitude of said first interval equals the product of the magnitude of said second predetermined number of pulses and the magnitude of said second interval when said predetermined numbers are measured in the same units of increment and said intervals are measured in the same units of time.

22. In an apparatus for indicating the difference in speed of two bodies, a first pulse producing means supplying pulses at a frequency proportional to the speed of the first of said two bodies, a second pulse producing means supplying pulses at a frequency proportional to the speed of the second of said two bodies, a reversible counter, a timing device having a timer with a fixed time cycle and a sequence control, said timing device determining a first and a second and a third fractional portion of a complete cycle, a plurality of gates, each said gate having an open condition in which pulses may pass therethrough and a closed condition in which pulses are prevented from flowing therethrough, means connecting said first pulse producing means to said counter and including a first and a second of said gates, means conecting said second pulse producing means to said counter and including a third of said gates and said second gate, said second gate being in series with each of said first and third gates and positioned intermediate said counter and said first and third gates, a plurality of switching devices, means operatively connecting said first gate to said timer and including a first of said switching devices, said first switching device being operable to control the open and closed condition of said first gate and being actuatable by said timer into a gate closing condition at the end of said first fractional portion of said time cycle to close said first gate, means operatively connecting said third gate to said timer and including a second of said switching devices, said second switching device being operable to control the open and closed condition of said third gate and being actuatable by said timer into a gate closing condition at the end of said second fractional portion of said time cycle to close said third gate, said sequence control being connected to said first and said second switching devices and operable to actuate said first and second switching devices into gate opening conditions in which said first and second switching devices open said first and third gates respectively, a third of said switching devices being connected to said timer and to said second gate and actuatable by said timer into a gate closing condition to close said second gate during said third fractional portion of said cycle and into a gate opening condition to open said second gate at the start of said first and said second fractional portions of said time cycle, said timer being effective to actuate said sequence control, said sequence control being effective upon a first of a plurality of successive actuations to open said first gate and upon a second of said plural actuations to open said third gate, said sequence control being connected to said counter and effective to render said counter in condition to count in one direction at said first actuation and in a direction opposite to said one direction at said second actuation.

23. In an apparatus for indicating the difference in speed of two bodies, a first pulse producing means supplying pulses at a frequency proportional to the speed of the first of said two bodies, a second pulse producing means supplying pulses at a frequency proportional to the speed of the second of said two bodies, a reversible counter, a timing device having a timer with a fixed time cycle and a sequence control, said timing device determining a first and a second and a third fractional portion of a complete cycle, a plurality of gates, each said gate having an open condition in which pulses may pass therethrough and a closed condition in which pulses are prevented from flowing therethrough, means connecting said first pulse producing means to said counter and including a first and a second of said gates, means connecting said second pulse producing means to said counter and including a third of said gates and said second gate, said second gate being in series with each of said first and third gates and positioned intermediate said counter and said first and third gates, a plurality of switching devices, means operatively connecting said first gate to said timer and including a first of said switching devices, said first switching device being operable to control the open and closed condition of said first gate and being actuatable by said timer into a gate closing condition at the end of said first fractional portion of said time cycle to close said first gate, means operatively connecting said third gate to said timer and including a second of said switching devices, said second switching device being operable to control the open and closed condition of said third gate and being actuatable by said timer into a gate closing condition at the end of said second fractional portion of said time cycle to close said third gate, said sequence control being connected to said first and said second switching devices and operable to actuate said first and second switching devices into gate opening conditions in which said first and second switching devices open said first and third gates respectively, a third of said switching devices being connected to said timer and to said second gate and actuatable by said timer into a gate closing condition to close said second gate during said third fractional portion of said cycle and into a gate opening condition to open said second gate at the start of said first and said second fractional portions of said time cycle, said timer being effective to actuate said sequence control, said sequence control being effective upon a first of a plurality of successive actuations to open said first gate and upon a second of said plural actuations to open said third gate, said sequence control being connected to said counter and effective to render said counter in condition to count in one direction at said first actuation and in a direction opposite to said one direction at said second actuation, and interrupting means actuated in response to the passage of a number of pulses through said third gate which is in excess of the number of pulses passed through said first gate for interrupting the operation of said timer and for closing said third gate and for thereafter reinitiating the operation of said timer and opening said third gate, said timing means being effective thereafter to render said counter in condition to count in said one direction.

24. In an apparatus for indicating the difference in speed of two bodies, a first pulse producing means supplying pulses at a frequency proportional to the speed of the first of said two bodies, a second pulse producing means supplying pulses at a frequency proportional to the speed of the second of said two bodies, a reversible counter, means including a cycling timing device having a fixed time cycle and a sequencing network for determining a first and a second and third fractional portion of a complete cycle, a plurality of gates, each said gate having an open condition in which pulses may pass therethrough and a closed condition in which pulses are prevented from flowing therethrough, a plurality of switching devices individually connected to said gates, each said switch having first and second conditions for controlling the open and closed condition of the respective said gate with which it is associated, means connecting said first pulse producing means to said counter and including a first and a second of said gates, means connecting said second pulse producing means to said counter and including a third of said gates and said second gate, said second gate being in series with each of said first and third gates and positioned intermediate said counter and said first and third gates, means operatively connecting said first gate to said timing device and including a first of said switching devices whereby said first gate is held in its said open condition during said first fractional portion of said time cycle and actuated to said closed condition at the end of said first fractional time cycle portion, means operatively connecting said third gate to said timing device and including a second of said switching devices whereby said third gate is held in its said open condition during said second fractional portion of said time cycle and actuated to said closed condition at the end of said second fractional time cycle portion, said sequencing network being connected to said first and said second switching devices and operative to actuate said first and second switching devices into their said first conditions, a third of said switching devices being connected to and actuatable by said timing device into its said second condition during said third fractional portion of said cycle and actuated into its said first condition at the end of said complete cycle, said third switching device being connected to said timing device and to said second gate and to said sequencing network, said third switching device being actuatable by said timing device into its said first condition to open said second gate and into its said second condition to actuate said sequence control, said sequence control being effective upon successive actuations to open alternately said first and third gates, said sequencing network being connected to said counter and effective to render said counter in condition to count in one direction during said first fractional portion of said complete cycle when said first gate is open and in a direction opposite to said one direction during at least the initial portion of said second fractional portion of said complete cycle.

25. In an apparatus for indicating the difference in speed of two bodies, a first pulse producing means supplying pulses at a frequency proportional to the speed of the first of said two bodies, a second pulse producing means supplying pulses at a frequency proportional to the speed of the second of said two bodies, a reversible counter, a cycling timing device having a fixed time cycle, a plurality of gates, each said gate having an open condition in which pulses may pass therethrough and a closed condition in which pulses are prevented from flowing therethrough, a plurality of switching devices individually connected to said gates, each said switching device having first condition and second condition for controlling the open and closed condition of the respective said gate with which it is associated, means connecting said first pulse producing means to said counter and including a first and a second of said gates, means connecting said second pulse producing means to said counter and including a third of said gates and said second gate, said second gate being in series with each of said first and third gates and positioned intermediate said counter and said first and third gates, means operatively connecting said first gate to said timing device and including a first of said switching devices, said timing device being effective to actuate said first switching device to its said second condition to determine the end of a first fractional portion of a complete time period, means operatively connecting said third gate to said timing device and including a second of said switching devices, said timing device being effective to actuate said second switching device to its said second condition to determine the end of a second fractional portion of said complete time period, a sequencing network connected to said first and said second switching devices and to said second gate, said sequencing network being operative to actuate said first and second switching devices into their said first conditions and to close said second gate, said third switching device being connected to said second gate and to said timing device and actuatable by said timing device into its said first condition to open said second gate to initiate selectively said first and said second fractional portions of said complete period and into its said second condition to actuate said sequencing network, said sequencing network being connected to said counter and operative to render said counter in condition to count in one direction when said first gate is open and in a direction opposite to said one direction during at least the initial portion of said second fractional portion of said complete cycle.

References Cited by the Examiner

UNITED STATES PATENTS

| | | | |
|---|---|---|---|
| 2,700,750 | 1/55 | Dickinson | 328—44 |
| 2,705,303 | 3/55 | Stinger | 324—70 |
| 2,880,934 | 4/59 | Bensky et al. | 328—44 X |
| 2,915,703 | 12/59 | Kessler | 324—69 |
| 2,931,979 | 4/60 | Uphoff et al. | 324—69 |
| 2,951,986 | 9/60 | Gordon | 324—79 |
| 2,965,843 | 12/60 | Sterk | 324—68 |
| 2,987,674 | 6/61 | Shain | 324—68 X |

WALTER L. CARLSON, *Primary Examiner.*

SAMUEL BERNSTEIN, FREDERICK M. STRADER, *Examiners.*